(12) United States Patent
Kumar et al.

(10) Patent No.: US 12,478,236 B2
(45) Date of Patent: Nov. 25, 2025

(54) DETECTION AND PRESENTATION OF VARIOUS SURFACE TYPES BY AN AUTONOMOUS VACUUM

(71) Applicant: Matic Robots, Inc., Mountain View, CA (US)

(72) Inventors: Anshuman Kumar, San Francisco, CA (US); Karthik Chandrashekaraiah, San Francisco, CA (US); Vishal Jain, San Francisco, CA (US); Nathan Elio Madonia, Mountain View, CA (US); William George Plummer, Mountain View, CA (US); Tristan Pierre Gervais, Sunnyvale, CA (US); Prabhakar Manoj Naik, Maharashtra (IN); Clayton Haight, Mississauga (CA); Vivek Kumar Bagaria, Mountain View, CA (US); Seungho Yang, Mountain View, CA (US); Navneet Dalal, Atherton, CA (US); Mehul Nariyawala, Los Altos, CA (US)

(73) Assignee: MATIC ROBOTS, INC., Mountain View, CA (US)

( * ) Notice: Subject to any disclaimer, the term of this patent is extended or adjusted under 35 U.S.C. 154(b) by 0 days.

(21) Appl. No.: 17/883,880

(22) Filed: Aug. 9, 2022

(65) Prior Publication Data

US 2023/0062104 A1  Mar. 2, 2023

Related U.S. Application Data

(60) Provisional application No. 63/231,164, filed on Aug. 9, 2021.

(51) Int. Cl.
  *A47L 9/28*  (2006.01)
  *A47L 11/40*  (2006.01)
  *G05D 1/00*  (2006.01)

(52) U.S. Cl.
  CPC .......... *A47L 9/2826* (2013.01); *A47L 9/2831* (2013.01); *A47L 9/2894* (2013.01); *A47L 11/4011* (2013.01); *G05D 1/0011* (2013.01); *A47L 2201/04* (2013.01); *A47L 2201/06* (2013.01)

(58) Field of Classification Search
  CPC .... A47L 9/2826; A47L 9/2831; A47L 9/2894; A47L 2201/04; A47L 2201/06;
  (Continued)

(56) References Cited

U.S. PATENT DOCUMENTS 4,674,741 A * 6/1987 Pasierb, Jr. .......... A63B 21/153
  482/72
9,038,233 B2  5/2015 Jones et al.
(Continued)

FOREIGN PATENT DOCUMENTS

EP  1195127 A2  4/2002

OTHER PUBLICATIONS

PCT International Search Report and Written Opinion, PCT Application No. PCT/US22/39868, Dec. 28, 2022, 18 pages.

*Primary Examiner* — Erin F Bergner
(74) *Attorney, Agent, or Firm* — Fenwick & West LLP

(57) ABSTRACT

Systems and methods for navigating an autonomous vacuum are disclosed. According to one method, the autonomous vacuum traverses a cleaning environment having a plurality of surfaces. As the autonomous vacuum is traversing the cleaning environment, sensors on the autonomous vacuum capture sensor data describing a first section of a surface on which the autonomous vacuum is currently traversing. Based on the received sensor data, the autonomous vacuum can determine that the first section is of a first surface type
(Continued)

of a plurality of surface types. The autonomous vacuum can generate a user interface with a background displaying the determined first surface type to notify the user of where the autonomous vacuum is cleaning.

8 Claims, 32 Drawing Sheets

(58) Field of Classification Search
CPC .... A47L 9/0477; A47L 9/0488; A47L 9/0494; A47L 9/2847; A47L 9/2852; A47L 11/4011; G05D 1/0011; G05D 1/0246; G05D 1/0044
See application file for complete search history.

(56) References Cited

U.S. PATENT DOCUMENTS

| | | |
|---|---|---|
| 10,292,560 B2 | 5/2019 | Doughty |
| 10,517,454 B2 | 12/2019 | Jones et al. |
| 10,568,483 B2 | 2/2020 | Lewis |
| 11,058,271 B2 | 7/2021 | Blouin |
| 11,103,113 B2 | 8/2021 | Schregardus et al. |
| 11,278,173 B2 | 3/2022 | Jones et al. |
| 2017/0172367 A1 | 6/2017 | Kim et al. |
| 2018/0289231 A1 | 10/2018 | Santini |
| 2018/0361583 A1 | 12/2018 | Williams et al. |
| 2019/0204851 A1* | 7/2019 | Afrouzi ................. A47L 9/0405 |
| 2020/0000302 A1* | 1/2020 | Morin ................. A47L 11/4088 |
| 2020/0178748 A1* | 6/2020 | Han ......................... A47L 9/28 |
| 2021/0096560 A1* | 4/2021 | al-Mohssen ......... G05D 1/0231 |

\* cited by examiner

Front View
2000

Top View
2050

DETECTION AND PRESENTATION OF VARIOUS SURFACE TYPES BY AN AUTONOMOUS VACUUM

CROSS REFERENCE TO RELATED APPLICATIONS

This application claims priority to and the benefit of U.S. Provisional Application No. 63/231,164 filed on Aug. 9, 2021, which is incorporated by reference in its entirety.

TECHNICAL FIELD

This disclosure relates to autonomous cleaning systems. More particularly, this disclosure describes detecting surface types in an environment and generating user interfaces with backgrounds representative of surface types.

BACKGROUND

Conventional autonomous floor cleaning systems are limited in what information about an environment is presented to a user via user interfaces. For example, autonomous floor cleaning systems may only depict a two-dimensional rendering of an environment lacking in information about surfaces, messes, and obstacles in the environment. A user may use this rendering to understand where the autonomous floor cleaning system has cleaned but may be unable to see more information about the surfaces the autonomous floor cleaning system has cleaned, such as a type, pattern, orientation, texture, and the like of the flooring. Without this information, a user may be unable to contextualize how the autonomous floor cleaning system is cleaning and whether the autonomous floor cleaning system is using the correct techniques to clean the environment.

SUMMARY

An autonomous vacuum (also referred to as an autonomous cleaning robot) described herein uses a set of sensors to capture data about an environment. The autonomous vacuum determines surface types depicted in the data of the environment and characteristics of each surface type. The autonomous vacuum generates a user interface that depicts surface types in a background that updates to depict a surface that the autonomous vacuum is traversing in real-time.

In particular, a processor instructs components of the autonomous vacuum to cause the autonomous vacuum to traverse an environment. The environment may include a plurality of surface types on a surface of the environment. The autonomous vacuum receives first sensor data corresponding to a first set of characteristics of a first section of the floor that the autonomous vacuum is traversing in real-time. The autonomous vacuum determines, based on the first sensor data, a first surface type of a plurality of surface types for the first section. The autonomous vacuum generates a first user interface with a background displaying the first surface type. The autonomous vacuum may display the user interface via an integrated display or transmit the user interface to a client device for display.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

Figure (FIG. 1 is a block diagram of an autonomous vacuum, according to one example embodiment.

Figure 1:
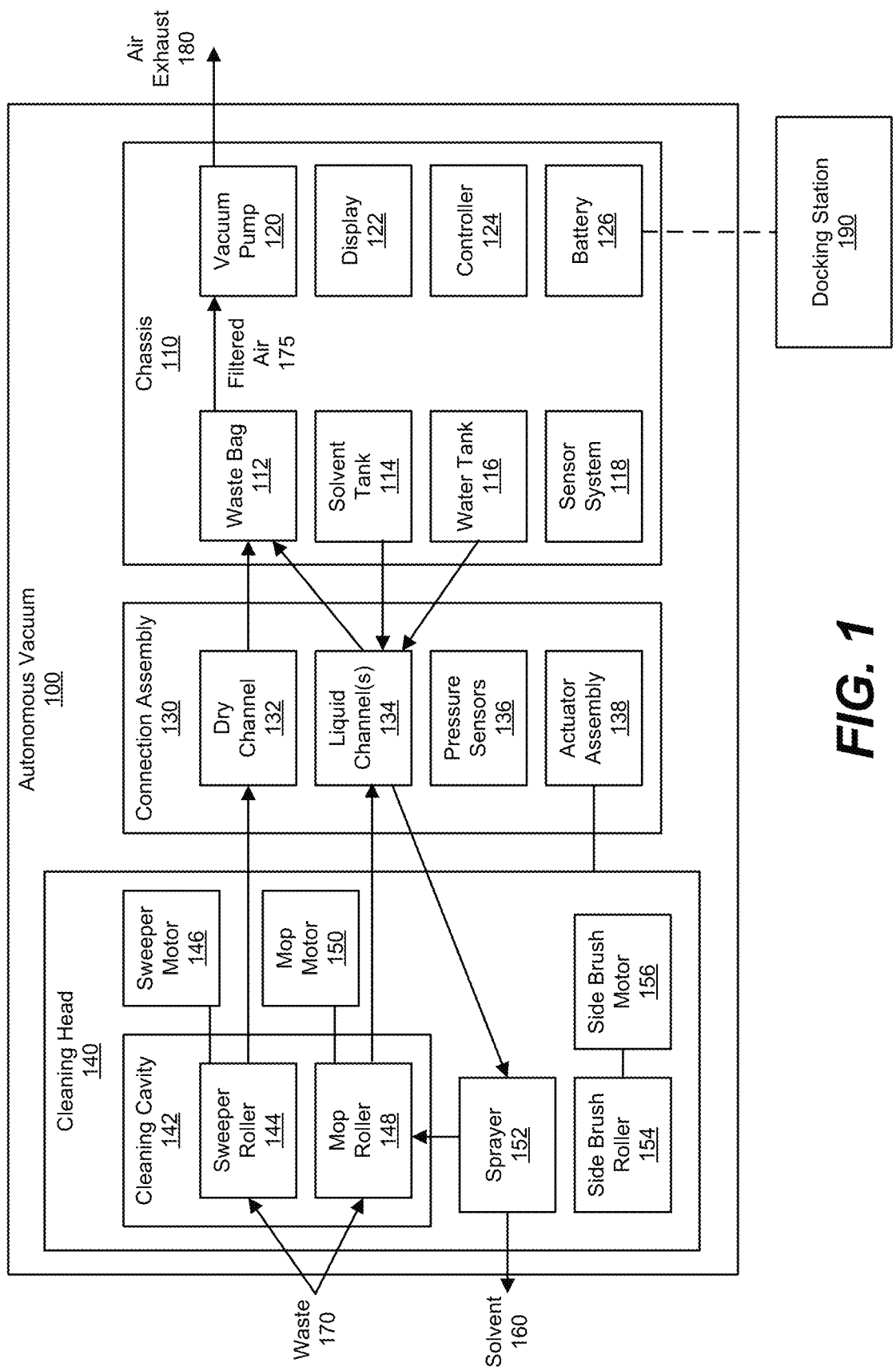

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

An autonomous cleaning system may run into a host of problems while attempting to complete clean messes within an environment. In particular, the autonomous cleaning system may clean multiple surface types in an environment. Each surface type can be associated with different optimal methods of cleaning (e.g., mopping tile floor, vacuuming carpet floors, etc.), so the autonomous cleaning system needs to understand where the different surface types are located in the environment to properly clean the environment.

The following detailed description describes an autonomous cleaning robot. As previously noted, for ease of discussion and by way of one example, the autonomous cleaning robot will be described as an autonomous vacuum. The principles described herein are not intended to be limited to an autonomous vacuum and it is understood that the principles describe may be applied to other autonomous cleaning robot configurations, including an autonomous sweeper, an autonomous mop, an autonomous duster, or an autonomous cleaning robot that may combine two or more cleaning functions (e.g., vacuum and sweep or dust and mop).

In one example embodiment, an autonomous vacuum may include a self-actuated head that can account for some of these common cleaning issues. The autonomous vacuum roams around an environment (such as a house) to map the environment and detect messes within the environment. The autonomous vacuum includes an automated cleaning head that adjusts its height for cleaning a mess based on the mess type, surface type, and/or size of the mess. The autonomous vacuum may include a waste bag for collecting both liquid and solid waste, a camera sensor system for capturing visual-inertial data, and a variety of sensors in a sensor system for collecting other visual, audio, lidar, IR (infrared), time of flight, and inertial data (i.e., sensor data) about the environment. The autonomous vacuum may use this sensor data to map the environment, detect messes, compile and execute a task list of cleaning tasks, receive user instructions, and navigate the environment.

System Architecture

FIG. 1 is a block diagram of an autonomous vacuum 100, according to one example embodiment. The autonomous vacuum 100 in this example may include a chassis 110, a connection assembly 130, and a cleaning head 140. The components of the autonomous vacuum 100 allow the autonomous vacuum 100 to intelligently clean as the autonomous vacuum 100 traverses an area within an environment.

As an overview, the chassis 110 is a rigid body that serves as a base frame for the autonomous vacuum. The chassis 110 comprises a plurality of motorized wheels for driving the autonomous vacuum 100. The chassis 110 hosts a suite of other components for navigating the autonomous vacuum 100, communicating with external devices, providing notifications, among other operations. The connection assembly 130 serves as a connection point between the cleaning head 140 and the chassis 110. The connection assembly 130 comprises at least a plurality of channels used to direct solvent, water, waste, or some combination thereof between the cleaning head 140 and the chassis 110. The connection assembly 130 also comprises an actuator assembly 138 that controls movement of the cleaning head 140. The cleaning head 140 comprises the one or more brush rollers used to perform cleaning operations. In some embodiments, the architecture of the autonomous vacuum 100 includes more components for autonomous cleaning purposes. Some examples include a mop roller, a solvent spray system, a waste container, and multiple solvent containers for different types of cleaning solvents. It is noted that the autonomous vacuum 100 may include functions that include cleaning functions that include, for example, vacuuming, sweeping, dusting, mopping, and/or deep cleaning.

The chassis 110 is a rigid body as a base frame for the autonomous vacuum 100. In one or more embodiments, the chassis 110 comprises at least a waste bag 112, a solvent tank 114, a water tank 116, a sensor system 118, a vacuum pump 120, a display 122, a controller 124, and a battery 126. In other embodiments, the chassis 110 may comprise additional, fewer, or different components than those listed herein. For example, one embodiment of the chassis 110 omits the display 122. Or another embodiment includes an additional output device, such as a speaker. Still another embodiment may combine the solvent tank 114 and the water tank 116 into a single tank.

The waste bag 112 collects the waste that is accumulated from performing cleaning routines. The waste bag 112 may be configured to collect solid and/or liquid waste. In one or more embodiments, there may be two separate waste bags, one for solid waste and one for liquid waste. The waste bag 112 may be removably secured within the chassis 110. As the waste bag 112 is filled, the autonomous vacuum 100 may alert the user to empty the waste bag 112 and/or replace the waste bag 112. In other embodiments, the waste bag 112 can remain in the chassis 110 when emptied. In such embodiments, the chassis 110 may further comprise a drainage channel connected to the waste bag to drain the collected waste. The waste bag 112 may further comprise an absorbent material that soaks up liquid, e.g., to prevent the liquid from sloshing out of the bag during operation of the autonomous vacuum 100.

The solvent tank 114 comprises solvent used for cleaning. The solvent tank 114 comprises at least a chamber and one or more valves for dispensing from the chamber. The solvent is a chemical formulation used for cleaning. Example solvents include dish detergent, soap, bleach, other organic and/or nonorganic solvents. In some embodiments, the solvent tank 114 comprises dry solvent that is mixed with water from the water tank 116 to create a cleaning solution. The solvent tank may be removable, allowing a user to refill the solvent tank 114 when the solvent tank 114 is empty.

The water tank 116 stores water used for cleaning. The water tank 116 comprises at least a chamber and one or more valves for dispensing from the chamber. The water tank 116 may be removable, allowing a user to refill the water tank 116 when the water tank 116 is empty. In one or more embodiments, the water tank 116 comprises a valve located on the bottom of the water tank 116, when the water tank 116 is secured in the chassis 110. The weight of the water applies a downward force due to gravity, a spring mechanism, or some combination thereof, which keeps the valve closed. To open the valve, some protrusion on the chassis 110 applies a counteracting upward force that opens the valve, e.g., by pushing the valve towards an interior of the chamber revealing an outlet permitting water to escape the water tank 116.

The sensor system 118 comprises a suite of sensors for guiding operation of the autonomous vacuum 100. The sensor system 118 is further described in FIG. 3.

The vacuum pump 120 generates a vacuum force that aids ingestion of waste by the cleaning head 140. In one or more embodiments, to generate the vacuum force, the vacuum pump 120 may comprise one or more fans that rotate to rapidly move air. The vacuum force flows through the waste bag 112, through the connection assembly 130, and to the cleaning head 140.

The display 122 is an electronic display that can display visual content. The display 122 may be positioned on a topside of the autonomous vacuum 100. The display may be configured to notify a user regarding operation of the autonomous vacuum 100. For example, notifications may describe an operation being performed by the autonomous vacuum 100, an error message, the health of the autonomous vacuum 100, etc. The display 122 may be an output device that includes a driver and/or screen to drive presentation of (e.g., provides for display) and/or present visual information. The display 122 may include an application programming interface (API) that allows users to interact with and control the autonomous vacuum. In some embodiments, the display may additionally or alternatively include physical interface buttons along with a touch sensitive interface. The display 122 receives data from the sensor system 118 and may display the data via the API. The data may include renderings of a view (actual image or virtual) of a physical environment, a route of the autonomous vacuum 100 in the environment, obstacles in the environment, and messes encountered in the environment. The data may also include alerts, analytics, and statistics about cleaning performance of the autonomous vacuum 100 and messes and obstacles detected in the environment.

The controller 124 is a general computing device that controls operation of the autonomous vacuum 100. As a general computing device, the controller 124 may comprise at least one or more processors and computer-readable storage media for storing instructions executable by the processors. Operations of the controller 124 include navigating the autonomous vacuum 100, simultaneous localization and mapping of the autonomous vacuum 100, controlling operation of the cleaning head 140, generating notifications to provide to the user via one or more output devices (e.g., the display 122, a speaker, or a notification transmittable to the user's client device, etc.), running quality checks on the various components of the autonomous vacuum 100, controlling docking at the docking station 190, etc.

The controller 124 may control movement of the autonomous vacuum 100. In particular, the controller connects to one more motors connected to one or more wheels that may be used to move the autonomous vacuum 100 based on sensor data captured by the sensor system 118 (e.g., indicating a location of a mess to travel to). The controller may cause the motors to rotate the wheels forward/backward or turn to move the autonomous vacuum 100 in the environment. Based on surface type detection by the sensor system 118, the controller 124 may modify or alter navigation of the autonomous vacuum 100.

The controller of the actuator assembly 138 may also control cleaning operations. Cleaning operations may include a combination of rotation of the brush rollers, positioning or orienting the cleaning head 140 via the actuator assembly 138, controlling dispersion of solvent, activation of the vacuum pump 120, monitoring the sensor system 118, other functions of the autonomous vacuum, etc.

In controlling rotation of the brush rollers, the controller 124 may connect to one or more motors (e.g., the sweeper motor 146, the mop motor 150, and the side brush motor 156) positioned at the ends of the brush rollers. The controller 124 can toggle rotation of the brush rollers between rotating forward or backward or not rotating using the motors. In some embodiments, the brush rollers may be connected to an enclosure of the cleaning head 140 via rotation assemblies each comprising one or more of direct drive, geared or belted drive assemblies that connect to the motors to control rotation of the brush rollers. The controller 124 may rotate the brush rollers based on a direction needed to clean a mess or move a component of the autonomous vacuum 100. In some embodiments, the sensor system 118 determines an amount of pressure needed to clean a mess (e.g., more pressure for a stain than for a spill), and the controller 124 may alter the rotation of the brush rollers to match the determined pressure. The controller 124 may, in some instances, be coupled to a load cell at each brush roller used to detect pressure being applied by the brush roller. In another instance, the sensor system 118 may be able to determine an amount of current required to spin each brush roller at a set number of rotations per minute (RPM), which may be used to determine a pressure being exerted by the brush roller. The sensor system 118 may also determine whether the autonomous vacuum 100 is able to meet an expected movement (e.g., if a brush roller is jammed) and adjust the rotation via the controller if not. Thus, the sensor system 118 may optimize a load being applied by each brush roller in a feedback control loop to improve cleaning efficacy and mobility in the environment. The controller 124 may additionally control dispersion of solvent during the cleaning operation by controlling a combination of the sprayer 152, the liquid channels 134, the solvent tank 114, the water tank 116, and turning on/off the vacuum pump 120.

The battery 126 stores electric charge for powering the autonomous vacuum 100. The battery 126 may be rechargeable when the autonomous vacuum 100 is docked at the docking station 190. The battery 126 may implement a battery optimization scheme to efficiently distribute power across the various components. The autonomous vacuum 100 is powered with an internal battery 126. The battery 126 stores and supplies electrical power for the autonomous vacuum 100. In some embodiments, the battery 126 consists of multiple smaller batteries that charge specific components of the autonomous vacuum 100. The autonomous vacuum 100 may dock at a docking station 190 to charge the battery 126. The docking station 190 may be connected to an external power source to provide power to the battery 126. External power sources may include a household power source and one or more solar panels. The docking station 190 also may include processing, memory, and communication computing components that may be used to communicate with the autonomous vacuum 100 and/or a cloud computing infrastructure (e.g., via wired or wireless communication). These computing components may be used for firmware updates and/or communicating maintenance status. The docking station 190 also may include other components, such as a cleaning station for the autonomous vacuum 100. In some embodiments, the cleaning station includes a solvent tray that the autonomous vacuum 100 may spray solvent into and roll the roller 144 or the side brush roller 154 in for cleaning. In other embodiments, the autonomous vacuum may eject the waste bag 112 into a container located at the docking station 190 for a user to remove.

The connection assembly 130 is a rigid body that connects the cleaning head 140 to the chassis 110. A four-bar linkage may join the cleaning head 140 to the connection assembly 130. In one or more embodiments, the connection assembly 130 comprises at least a dry channel 132, one or more liquid channels 134, one or more pressure sensors 136, and an actuator assembly. Channel refers generally to either a dry channel or a liquid channel. In other embodiments, the connection assembly 130 may comprise additional, fewer, or different components than those listed herein. For example, one or more sensors of the sensor system 118 may be disposed on the connection assembly 130.

The dry channel 132 is a conduit for dry waste from the cleaning head 140 to the waste bag 112. The dry channel 132 is substantially large in diameter to permit movement of most household waste.

The one or more liquid channels 134 are conduits for liquids between the cleaning head 140 and the chassis 110. There is at least one liquid channel 134 (a liquid waste channel) that carries liquid waste from the cleaning head 140 to the waste bag 112. In one or more embodiments, the liquid channel 134 carrying liquid waste may be smaller in diameter than the dry channel 132. In such embodiments, the autonomous vacuum 100 sweeps (collecting dry waste) before mopping (collecting liquid waste). There is at least one other liquid channel 134 (a liquid solution channel) that carries water, solvent, and/or cleaning solution (combination of water and solvent) from the chassis 110 to the cleaning head 140 for dispersal to the cleaning environment.

The one or more pressure sensors 136 measure pressure in one or more of the channels. The pressure sensors 136 may be located at various positions along the connection assembly 130. The pressure sensors 136 provide the pressure measurements to the controller 124 for processing.

The actuator assembly 138 controls movement and position of the cleaning head 140, relative to the chassis 110. The actuator assembly 138 comprises at least one or more actuators configured to generate linear and/or rotational movement of the cleaning head 140. Linear movement may include vertical height of the cleaning head 140. Rotational movement may include pitching the cleaning head 140 to varying angles, e.g., to switch between sweeping mope and mopping mode, or to adjust cleaning by the cleaning head 140 based on detected feedback signals. The actuator assembly 138 may comprise a series of joints that aid in providing the movement to the cleaning head 140.

The cleaning head 140 performs one or more cleaning operations to clean an environment. The cleaning head 140 is also a rigid body that forms a cleaning cavity 142, where a sweeper roller 144 and a mop roller 148 are disposed. The cleaning head 140 further comprises a sweeper motor 146, a mop motor 150, a sprayer 152, a side brush roller 154, and a side brush motor 156. Collectively, the sweeper roller 144, the mop roller 148, and the side brush roller 154 are referred to as the brush rollers. Likewise, the brush motors include the sweeper motor 146, the mop motor 150, and the side brush motor 156. In some embodiments, each brush roller may be composed of different materials and operate at different times and/or speeds, depending on a cleaning task being executed by the autonomous vacuum 100. In other embodiments, the cleaning head 140 comprises additional, fewer, or different components than those listed herein. In some embodiments, the autonomous vacuum 100 may include two or more sweeper rollers 144 controlled by two or more sweeper motors 146. In some embodiments, the cleaning head 140 may be referred to as a roller housing.

The sweeper roller 144 sweeps dry waste into the autonomous vacuum 100. The sweeper roller 144 generally comprises one or more brushes attached to a cylindrical core. The sweeper roller 144 rotates to collect and clean messes. The sweeper roller 144 may be used to handle large particle messes, such as food spills or small plastic items like bottle caps. When the sweeper roller 144 is activated by the sweeper motor 146, the brushes act in concert to sweep dry waste towards a dry inlet connected to the dry channel 132.

The brushes may be composed of a compliant material to sweep the most dry waste. In some embodiments, the sweeper roller 144 may be composed of multiple materials for collecting a variety of waste, including synthetic bristle material, microfiber, wool, or felt.

The mop roller 148 mops the cleaning environment and ingests liquid waste into the autonomous vacuum 100. The mop roller 148 generally comprises fabric bristles attached to a cylindrical core. With the aid of a cleaning solution, the fabric bristles work to scrub away dirt, grease, or other contaminants that may have stuck to the cleaning surface. The mop motor 150 provides rotational force to the mop roller 148. In some embodiments, the mop roller 148 may be composed of multiple materials for collecting a variety of waste, including synthetic bristle material, microfiber, wool, or felt.

In normal sweeping mode, as the air flows from the dry channel 132 and the dry inlet towards the vacuum pump 120, the sweeper roller 144 rotates to move dry waste from the cleaning environment towards the inlet, in order to deposit the dry waste in the waste bag 112. In normal mopping mode, the cleaning head 140 sprays the cleaning solution (solvent or solvent mixed with water) onto the cleaning environment or on top of the mop roller itself. The mop roller 148 contacts the sprayed surface to scrub the surface with the fabric bristles. The vacuum force sucks up or ingests the liquid waste to deposit the liquid waste into the waste bag 112.

The side brush roller 154 sweeps dirt near a side of the cleaning head 140. The side brush roller 154 may rotate along an axis that is orthogonal or perpendicular to the ground. The side brush that is controlled by a side brush motor 156. The side brush roller 154 may be shaped like a disk or a radial arrangement of bristles that can push dirt into the path of the sweeper roller 144. In some embodiments, the side brush roller 154 is composed of different materials than the sweeper roller 144 to handle different types of waste and mess. In one or more embodiments, the side brush roller 154 may be concealed to minimize a profile of the cleaning head 140 when the side brush roller 154 is not in operation.

The sprayer 152 sprays liquid into the cleaning environment. The sprayer 152 is connected to the liquid solution channel that is connected to the solvent tank 114 and/or the water tank 116. A pump on the chassis 110 can dispense solvent and/or water from the solvent tank 114 and/or the water tank 116. The liquid travels to the sprayer 152, which then has a nozzle for spraying the liquid into the cleaning environment. The sprayer 152 may include a plurality of nozzles, e.g., two disposed on either side of the cleaning head.

The cleaning head 140 ingests waste 155 as the autonomous vacuum 100 cleans using the roller 144 and the side brush roller 154 and sends the waste 155 to the waste bag 112. The waste bag 112 collects and filters waste 155 from the air to send filtered air 165 out of the autonomous vacuum 100 through the vacuum pump 120 as air exhaust 170. The autonomous vacuum 100 may also use solvent 160 combined with pressure from the cleaning head 140 to clean a variety of surface types. The autonomous vacuum may dispense solvent 160 from the solvent tank 114 onto an area to remove dirt, such as dust, stains, and solid waste and/or clean up liquid waste. The autonomous vacuum 100 may also dispense solvent 160 into a separate solvent tray, which may be part of a charging station (e.g., docking station 190), described below, clean the roller 144 and the side brush roller 154.

Mess types are the form of mess in the environment, such as smudges, stains, and spills. It also includes the type of phase the mess embodies, such as liquid, solid, semi-solid, or a combination of liquid and solid. Some examples of waste include bits of paper, popcorn, leaves, and particulate dust. A mess typically has a size/form factor that is relatively small compared to obstacles that are larger. For example, spilled dry cereal may be a mess but the bowl it came in would be an obstacle. Spilled liquid may be a mess, but the glass that held it may be an obstacle. However, if the glass broke into smaller pieces, the glass would then be a mess rather than an obstacle. Further, if the sensor system 118 determines that the autonomous vacuum 100 cannot properly clean up the glass, the glass may again be considered an obstacle, and the sensor system 118 may send a notification to a user indicating that there is a mess that needs user cleaning. The mess may be visually defined in some embodiments, e.g., visual characteristics. In other embodiments it may be defined by particle size or make up. When defined by size, in some embodiments, a mess and an obstacle may coincide. For example, a small interlocking brick piece may be the size of both a mess and an obstacle. The sensor system 118 is further described in relation to FIG. 3.

The actuator assembly 138 includes one or more actuators (henceforth referred to as an actuator for simplicity), one or more controllers and/or processors (henceforth referred to as a controller for simplicity) that operate in conjunction with the sensor system 118 to control movement of the cleaning head 140. In particular, the sensor system 118 collects and uses sensor data to determine an optimal height for the cleaning head 140 given a surface type, surface height, and mess type. Surface types may be the floorings used in the environment and may include surfaces of varying characteristics (e.g., texture, material, absorbency), for example, carpet, wood, tile, rug, laminate, marble, and vinyl.

The actuator assembly 138 automatically adjusts the height of the cleaning head 140 given the surface type, surface height, and mess type. In particular, the actuator controls vertical movement and rotation tilt of the cleaning head 140. The actuator may vertically actuate the cleaning head 140 based on instructions from the sensor system 118. For example, the actuator may adjust the cleaning head 140 to a higher height if the sensor system 118 detects thick carpet in the environment than if the processor detects thin carpet. Further, the actuator may adjust the cleaning head 140 to a higher height for a solid waste spill than a liquid waste spill. In some embodiments, the actuator may set the height of the cleaning head 140 to push larger messes out of the path of the autonomous vacuum 100. For example, if the autonomous vacuum 100 is blocked by a pile of books, the sensor system 165 may detect the obstruction (i.e., the pile of books) and the actuator may move the cleanings head 105 to the height of the lowest book, and the autonomous vacuum 100 may move the books out of the way to continue cleaning an area. Furthermore, the autonomous vacuum 100 may detect the height of obstructions and/or obstacles, and if an obstruction or obstacle is over a threshold size, the autonomous vacuum 100 may use the collected visual data to determine whether to climb or circumvent the obstruction or obstacle by adjusting the cleaning head height using the actuator assembly 138.

In other embodiments, any of the components of the autonomous vacuum can be variable distributed among the chassis 110, the connection assembly 130, and the cleaning head 140.

Figure 2:
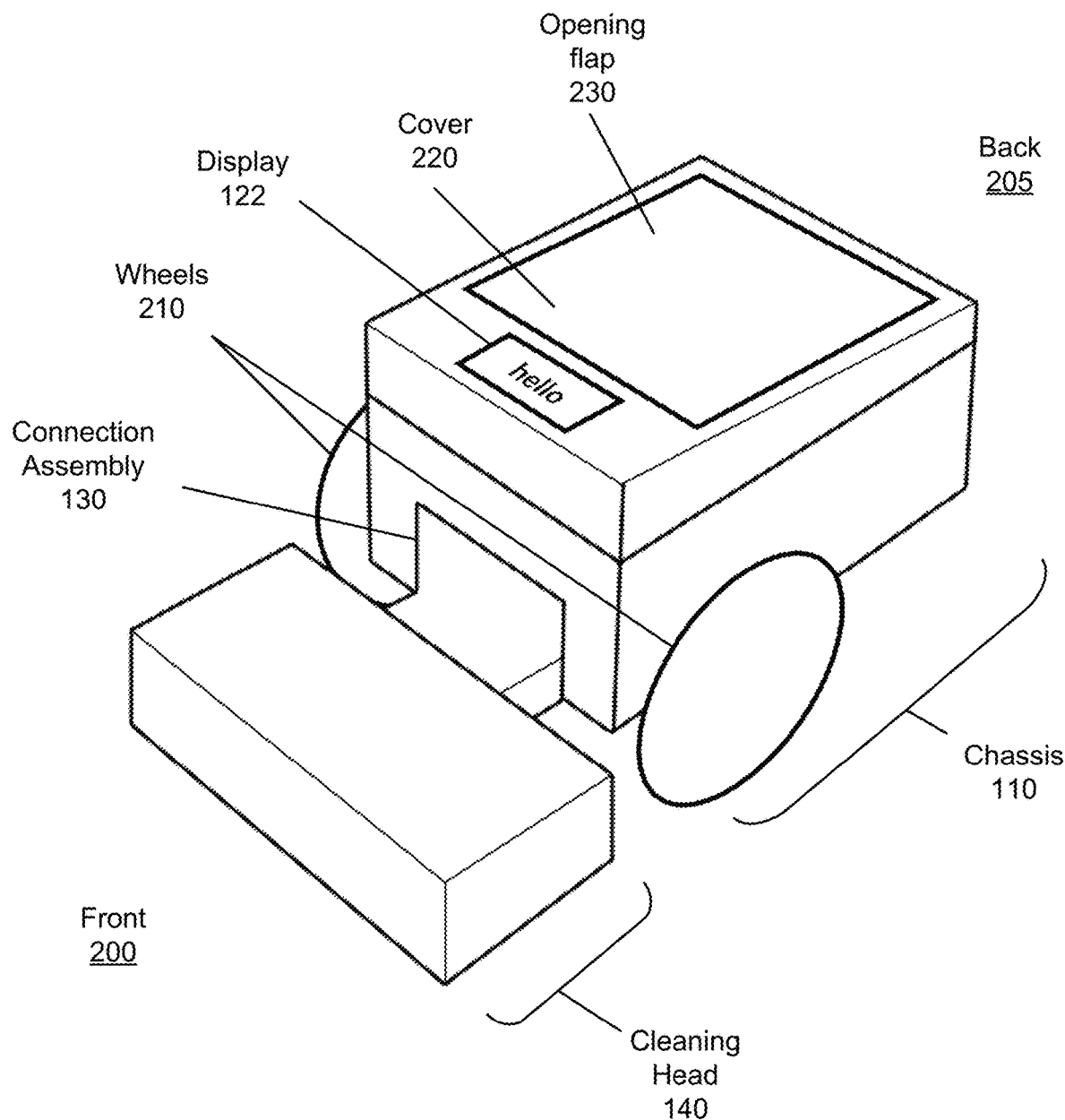
FIG. 2 illustrates a spatial arrangement of components of the autonomous vacuum, according to one example embodiment

FIG. 2 illustrates a spatial arrangement of components of the autonomous vacuum 100, according to one example embodiment. The autonomous vacuum 100 includes the cleaning head 140 (as described in relation to FIG. 1) at the front 200 and the chassis 110 at the back 205. The cleaning head 140 may be connected to the chassis 110 via the connection assembly 130 (e.g., a four-bar linkage system). The connection assembly 130 may be connected to one or more actuators of the actuator assembly 138 such that the actuators can control movement of the cleaning head 140 with the four-bar linkage system.

The chassis 110 includes the frame, a plurality of wheels 210, a cover 220, and opening flap 230, and a display 122. In particular, the cover 220 is an enclosed hollow structure that covers containers internal to the base that contain solvent and waste (e.g., in the waste bag 112). The opening flap 230 that may be opened or closed by a user such that the user can access the containers (e.g., to add more solvent, remove the waste bag 112, or put in a new waste bag 112). The cover may also house a subset of the sensors of the sensor system 118 and the actuator assembly 138, which may be configured at a front of the cover 220 to connect to the cleaning head 140. The display 122 is embedded in the cover 220 of the autonomous vacuum 100 and may include physical interface buttons and a touch sensitive interface.

Figure 3:
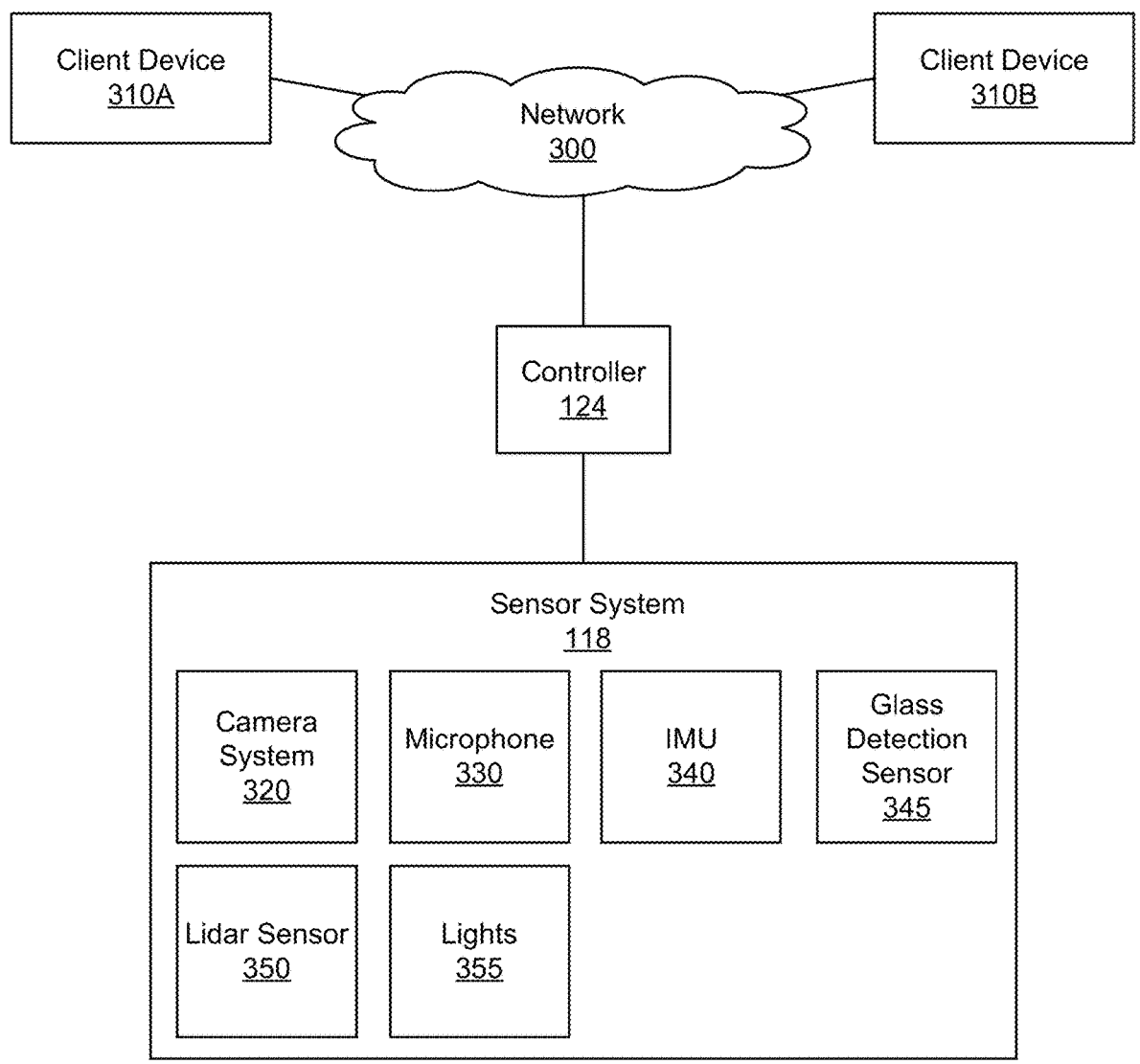
FIG. 3 is a block diagram of a sensor system of the autonomous vacuum, according to one example embodiment.

FIG. 3 is a block diagram of the sensor system 118 of the autonomous vacuum 100, according to one example embodiment. The sensor system 118 receives sensor data from, for example, one or more cameras (video/visual), microphones 330 (audio), lidar sensors infrared (IR) sensors, and/or inertial sensors that capture inertial data (e.g., environmental surrounding or environment sensor data) about an environment for cleaning. The sensor system 118 uses the sensor data to map the environment and determine and execute cleaning tasks to handle a variety of messes. The controller 124 manages operations of the sensor system 118 and its various components. The controller 124 may communicate with one or more client devices 310 via a network 300 to send sensor data, alert a user to messes, or receive cleaning tasks to add to a task list.

The network 300 may comprise any combination of local area and/or wide area networks, using wired and/or wireless communication systems. In one embodiment, the network 300 uses standard communications technologies and/or protocols. For example, the network 300 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 300 may be encrypted using any suitable technique or techniques.

Figure 4:
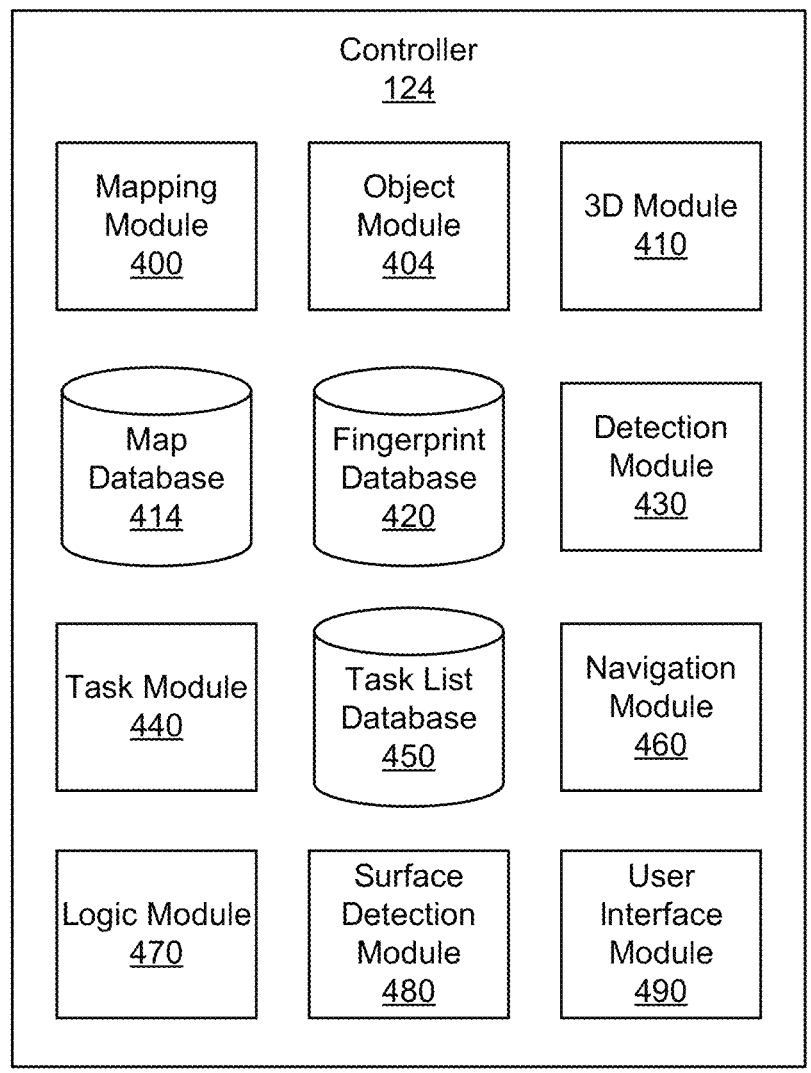
FIG. 4 is a block diagram of a storage medium of the sensor system, according to one example embodiment.

The client device 310 is a computing device capable of receiving user input as well as transmitting and/or receiving data via the network 300. Though only two client devices 310 are shown in FIG. 4, in some embodiments, more or less client devices 310 may be connected to the autonomous vacuum 100. In one embodiment, a client device 310 is a conventional computer system, such as a desktop or a laptop computer. Alternatively, a client device 310 may be a device having computer functionality, such as a personal digital assistant (PDA), a mobile telephone, a smartphone, a tablet, an Internet of Things (IoT) device, or another suitable device. A client device 310 is configured to communicate via the network 300. In one embodiment, a client device 310 executes an application allowing a user of the client device 310 to interact with the sensor system 118 to view sensor data, receive alerts, set cleaning settings, and add cleaning tasks to a task list for the autonomous vacuum 100 to complete, among other interactions. For example, a client device 310 executes a browser application with an application programming interface (API) that enables interactions between the client device 310 and the autonomous vacuum 100 via the network 300. In another embodiment, a client device 310 interacts with autonomous vacuum 100 through an application running on a native operating system of the client device 310, such as iOS® or ANDROID™.

In one or more embodiments, the sensor system 118 includes a camera system 320, microphone 330, inertial measurement device (IMU) 340, a glass detection sensor 345, a lidar sensor 350, and lights 355. The camera system 320 comprises one or more cameras that capture images and or video signals as visual data about the environment. In some embodiments, the camera system 320 includes an IMU (separate from the IMU 340 of the sensor system 118) for capturing visual-inertial data in conjunction with the cameras. The visual data captured by the camera system 320 may be used by storage medium for image processing, as described in relation to FIG. 4.

The microphone 330 captures audio data by converting sound into electrical signals that can be stored or processed by other components of the sensor system 118. The audio data may be processed to identify voice commands for controlling functions of the autonomous vacuum 100, as described in relation to FIG. 4. In an embodiment, sensor system 118 uses more than one microphone 330, such as an array of microphones.

The IMU 340 captures inertial data describing the autonomous vacuum's 100 force, angular rate, and orientation. The IMU 340 may comprise of one or more accelerometers, gyroscopes, and/or magnetometers. In some embodiments, the sensor system 118 employs multiple IMUS 340 to capture a range of inertial data that can be combined to determine a more precise measurement of the autonomous vacuum's 100 position in the environment based on the inertial data.

The glass detection sensor 345 detects glass in the environment. Glass may be transparent material that may be stained, leaded, laminate or the like and may be part of furniture, flooring, or other objects in the environment (e.g., cups, mirrors, candlesticks, etc.). The glass detection sensor 345 may be an infrared sensor and/or an ultrasound sensor. In some embodiments, the glass detection sensor 345 is coupled with the camera system 320 to remove glare from the visual data when glass is detected. For example, the camera system 320 may have integrated polarizing filters that can be applied to the cameras of the camera system 320 to remove glare. In some embodiments, the glass sensor is a combination of an IR sensor and neural network that determines if an obstacle in the environment is transparent (e.g., glass) or opaque.

The lidar sensor 350 emits pulsed light into the environment and detects reflections of the pulsed light on objects (e.g., obstacles or obstructions) in the environment. Lidar data captured by the lidar sensor 350 may be used to determine a 3D representation of the environment. The lights 355 are one or more illumination sources that may be used by the autonomous vacuum 100 to illuminate an area around the autonomous vacuum 100. In some embodiments, the lights may be LEDs, e.g., having a static color such as white or green, or changeable colors (such as green of operating, red for stopped and yellow indicating slowing down).

The controller 124 may control the sensor system 118 various functions attributed to the sensor system 118 described herein. For example, a storage medium may store one or more modules or applications (described in relation to FIG. 4) embodied as instructions executable by a processor. The instructions, when executed by the processor, cause the processor to carry out the functions attributed to the various modules or applications described herein or instruct the controller and/or actuator to carry out movements and/or functions. For example, instructions may include when to take the sensor data, where to move the autonomous vacuum 100 to, and how to clean up a mess. In one embodiment, the processor may comprise a single processor or a multi-processor system.

FIG. 4 is a block diagram of the controller 124, according to one example embodiment. The controller 124 includes a mapping module 400, an object module 405, a 3D module 410, a map database 415, a fingerprint database 420, a detection module 430, a task module 440, a task list database 450, a navigation module 460, a logic module 470, a surface detection module 480, and a user interface module 490. In some embodiments, the controller 124 includes other modules that control various functions for the autonomous vacuum 100. Examples include a separate image processing module, a separate command detection module, and an object database.

The mapping module 400 creates and updates a map of an environment as the autonomous vacuum 100 moves around the environment. The map may be a two-dimensional (2D) or a three-dimensional (3D) representation of the environment including objects and other defining features in the environment. For simplicity, the environment may be described in relation to a house in this description, but the autonomous vacuum 100 may be used in other environments in other embodiments. Example environments include offices, retail spaces, and classrooms. For a first mapping of the environment, the mapping module 400 receives visual data from the camera system 320 and uses the visual data to construct a map. In some embodiments, the mapping module 400 also uses inertial data from the IMU 340 and lidar and IR data to construct the map. For example, the mapping module 400 may use the inertial data to determine the position of the autonomous vacuum 100 in the environment, incrementally integrate the position of the autonomous vacuum 100, and construct the map based on the position. However, for simplicity, the data received by the mapping module 400 will be referred to as visual data throughout the description of this figure.

In another embodiment, the mapping module 400 may capture a 360 degree "panorama view" using the camera system 320 while the autonomous vacuum 100 rotates around a center axis. The mapping module 400 applies a neural network to the panorama view to determine a boundary within the environment (e.g., walls), which the mapping module 400 may use for the representation of the environment. In other embodiments, the mapping module 400 may cause the autonomous vacuum 100 to trace the boundary of the environment by moving close to walls or other bounding portions of the environment using the camera system 100. The mapping module 400 uses the boundary for the representation.

In another embodiment, mapping module 400 may use auto-detected unique key points and descriptions of these key points to create a nearest neighborhood database in the map database 410. Each key point describes a particular feature of the environment near the autonomous vacuum 100 and the descriptions describe aspects of the features, such as color, material, location, etc. As the autonomous vacuum 100 moves about the environment, the mapping module 400 uses the visual data to extract unique key points and descriptions from the environment.

In some embodiments, the mapping module 400 may determine key points using a neural network. The mapping module 400 estimates which key points are visible in the nearest neighborhood database by using the descriptions as matching scores. After the mapping module 400 determines there are a threshold number of key points within visibility, the mapping module 400 uses these key points to determine a current location of the autonomous vacuum 100 by triangulating the locations of the key points with both the image location in the current visual data and the known location (if available) of the key point from the map database 415.

In another embodiment, the mapping module 400 uses the key points between a previous frame and a current frame in the visual data to estimate the current location of the autonomous vacuum 100 by using these matches as reference. This is typically done when the autonomous vacuum 100 is seeing a new scene for the first time, or when the autonomous vacuum 100 is unable to localize using previously existing key points on the map. Using this embodiment, the mapping module 400 can determine the position of the autonomous vacuum 100 within the environment at any given time. Further, the mapping module 400 may periodically purge duplicate key points and add new descriptions for key points to consolidate the data describing the key points. In some embodiments, this is done while the autonomous vacuum 100 is at the docking station 190.

The mapping module 400 processes the visual data when the autonomous vacuum 100 is at the docking station 190. The mapping module 400 runs an expansive algorithm to process the visual data to identify the objects and other features of the environment and piece them together into the map. The mapping module stores the map in the map database 415 and may store the map as a 3D satellite view of the environment. The mapping module 400 may update the map in the map database 415 to account for movement of objects in the environment upon receiving more visual data from the autonomous vacuum 100 as it moves around the environment over time. By completing this processing at the docking station, the autonomous vacuum 100 may save processing power relative to mapping and updating the map while moving around the environment. The mapping module 400 may use the map to quickly locate and/or estimate the location of the autonomous vacuum 100 within the environment, which is faster than when computing the map at the same time. This allows the autonomous vacuum 100 to focus its processing power while moving on mess detection, localization, and user interactions while saving visual data for further analysis at the docking station 190.

The mapping module 400 constructs a layout of the environment as the basis of the map using visual data. The layout may include boundaries, such as walls, that define rooms, and the mapping module 400 layers objects into this layout to construct the map. In some embodiments, the mapping module 400 may use surface normals from 3D estimates of the environment and find dominant planes using one or more algorithms, such as RANSAC, which the mapping module 400 uses to construct the layout. In other embodiments, the mapping module 400 may predict masks corresponding to dominant planes in the environment using a neural network trained to locate the ground plane and surface planes on each side of the autonomous vacuum 100. If such surface planes are not present in the environment, the neural network may output an indication of "no planes." The neural network may be a state-of-the-art object detection and masking network trained on a dataset of visual data labeled with walls and other dominant planes.

The mapping module 400 also uses the visual data to analyze surfaces throughout the environment. The mapping module 400 may insert visual data for each surface into the map to be used by the detection module 430 as it detects messes in the environment, described further below. For each different surface in the environment, the mapping module 400 determines a surface type of the surface and tags the surface with the surface type in the map. Surface types include various types of carpet, wood, tile, and cement, and, in some embodiments, the mapping module 400 determines a height for each surface type. For example, in a house, the floor of a dining room may be wood, the floor of a living room may be nylon carpet, and the floor of a bedroom may be a polyester carpet that is thicker than a nylon carpet in a hallway. The mapping module may also determine and tag surface types for objects in the room, such as carpets or rugs. The mapping module 400 sends the information about the surface types in the environment to the surface detection module 480.

The mapping module 400 further analyzes the visual data to determine the objects in the environment. Objects may include furniture, rugs, people, pets, and everyday household objects that the autonomous vacuum 100 may encounter on the ground, such as books, toys, and bags. Some objects may be barriers that define a room or obstacles that the autonomous vacuum 100 may need to remove, move, or go around, such as a pile of books. To identify the objects in the environment, the mapping module 400 predicts the plane of the ground in the environment using the visual data and removes the plane from the visual data to segment out an object in 3D.

In some embodiments, the mapping module 400 uses an object database to determine what an object is. In other embodiments, the mapping module 400 retrieves and compares visual data retrieved from an external server to the segmented objects to determine what the object is and tag the object with a descriptor. In further embodiments, the mapping module 400 may use the pretrained object module 405, which may be neural network based, to detect and pixel-wise segment objects such as chairs, tables, books, shoes. For example, the mapping module 400 may tag each of 4 chairs around a table as "chair" and the table as "table" and may include unique identifiers for each object (i.e., "chair A" and "chair B").

In some embodiments, the mapping module 400 may also associate or tag an object with a barrier or warning. For example, the mapping module 400 may construct a virtual border around the top of a staircase in the map such that the autonomous vacuum 100 does not enter the virtual border to avoid falling down the stairs. As another example, the mapping module 400 may tag a baby with a warning that the baby is more fragile than other people in the environment.

The map may include three distinct levels for the objects in the environment: a long-term level, an intermediate level, and an immediate level. Each level may layer onto the layout of the environment to create the map of the entire environment. The long-term level contains a mapping of objects in the environment that are static. In some embodiments, an object may be considered static if the autonomous vacuum 100 has not detected that the object moved within the environment for a threshold amount of time (e.g., 10 days or more). In other embodiments, an object is static if the autonomous vacuum 100 never detects that the object moved. For example, in a bedroom, the bed may not move locations within the bedroom, so the bed would be part of the long-term level. The same may apply for a dresser, a nightstand, or an armoire. The long-term level also includes fixed components of the environment, such as walls, stairs, or the like.

The intermediate level contains a mapping of objects in the environment that are dynamic. These objects move regularly within the environment and may be objects that are usually moving, like a pet or child, or objects that move locations on a day-to-day basis, like chairs or bags. The mapping module 400 may assign objects to the intermediate level upon detecting that the objects move more often than a threshold amount of time. For example, the mapping module 400 may map chairs in a dining room to the intermediate level because the chairs move daily on average, but map the dining room table to the long-term level because the visual data has not shown that the dining room table has moved in more than 5 days. However, in some embodiments, the mapping module 400 does not use the intermediate level and only constructs the map using the long-term level and the immediate level.

The immediate level contains a mapping of objects within a threshold radius of the autonomous vacuum 100. The threshold radius may be set at a predetermined distance (i.e., 5 feet) or may be determined based on the objects the autonomous vacuum 100 can discern using the camera system 320 within a certain resolution given the amount of light in the environment. For example, the immediate level may contain objects in a wider vicinity around the autonomous vacuum 100 around noon, which is a bright time of day, than in the late evening, which may be darker if no indoor lights are on. In some embodiments, the immediate level includes any objects within a certain vicinity of the autonomous vacuum 100.

In other embodiments, the immediate level only includes objects within a certain vicinity that are moving, such as people or animals. For each person within the environment, the mapping module 400 may determine a fingerprint of the person to store in the fingerprint database 420. A fingerprint is a representation of a person and may include both audio and visual information, such as an image of the person's face (i.e., a face print), an outline of the person's body (i.e., a body print), a representation of the clothing the person is wearing, and a voice print describing aspects of the person's voice determined through voice print identification. The mapping module 400 may update a person's fingerprint in the fingerprint database 420 each time the autonomous vacuum 400 encounters the person to include more information describing the person's clothing, facial structure, voice, and any other identifying features.

In another embodiment, when the mapping module 400 detects a person in the environment, the mapping module 400 creates a temporary fingerprint using the representation of the clothing the person is currently wearing and uses the temporary fingerprint to track and follow a person in case this person interacts with the autonomous vacuum 100, for example, by telling the autonomous vacuum 100 to "follow me." Embodiments using temporary fingerprints allow the autonomous vacuum 100 to track people in the environment even without visual data of their faces or other defining characteristics of their appearance.

The mapping module 400 updates the mapping of objects within these levels as it gathers more visual data about the environment over time. In some embodiments, the mapping module 400 only updates the long-term level and the intermediate level while the autonomous vacuum 100 is at the docking station, but updates immediate level as the autonomous vacuum 100 moves around the environment. For objects in the long-term level, the mapping module 400 may determine a probabilistic error value about the movement of the object indicating the chance that the object moved within the environment and store the probabilistic error value in the map database 415 in association with the object. For objects in the long-term map with a probabilistic error value over a threshold value, the mapping module 400 characterizes the object in the map and an area that the object has been located in the map as ambiguous.

In some embodiments, the (optional) object module 405 detects and segments various objects in the environment. Some examples of objects include tables, chairs, shoes, bags, cats, and dogs. In one embodiment, the object module 405 uses a pre-trained neural network to detect and segment objects. The neural network may be trained on a labeled set of data describing an environment and objects in the environment. The object module 405 also detects humans and any joint points on them, such as knees, hips, ankles, wrists, elbows, shoulders, and head. In one embodiment, the object module 405 determines these joint points via a pre-trained neural network system on a labeled dataset of humans with joint points.

In some embodiments, the mapping module 400 uses the optional 3D module 410 to create a 3D rendering of the map. The 3D module 410 uses visual data captured by stereo cameras on the autonomous vacuum 100 to create an estimated 3D rendering of a scene in the environment. In one embodiment, the 3D module 410 uses a neural network with an input of two left and right stereo images and learns to produce estimated 3D renderings of videos using the neural network. This estimated 3D rendering can then be used to find 3D renderings of joint points on humans as computed by the object module 405. In one embodiment, the estimated 3D rendering can then be used to predict the ground plane for the mapping module 400. To predict the ground plane, the 3D module 410 uses a known camera position of the stereo cameras (from the hardware and industrial design layout) to determine an expected height ground plane. The 3D module 410 uses all image points with estimated 3D coordinates at the expected height as the ground plane. In another embodiment, the 3D module 410 can use the estimated 3D rendering to estimate various other planes in the environment, such as walls. To estimate which image points are on a wall, the 3D module 410 estimates clusters of image points that are vertical (or any expected angle for other planes) and groups connected image points into a plane.

In some embodiments, the mapping module 400 passes the 3D rendering through a scene-classification neural network to determine a hierarchical classification of the home. For example, a top layer of the classification decomposes the environment into different room types (e.g., kitchen, living room, storage, bathroom, etc.). A second layer decomposes each room according to objects (e.g., television, sofa, and vase in the living room and bed, dresser, and lamps in the bedroom). The autonomous vacuum 100 may subsequently use the hierarchical model in conjunction with the 3D rendering to understand the environment when presented with tasks in the environment (e.g., "clean by the lamp"). It is noted that the map ultimately may be provided for rendering on a device (e.g., wirelessly or wired connected) with an associated screen, for example, a smartphone, tablet, laptop or desktop computer. Further, the map may be transmitted to a cloud service before being provided for rendering on a device with an associated screen.

The detection module 430 detects messes within the environment, which are indicated by pixels in real-time visual data that do not match the surface type. As the autonomous vacuum 100 moves around the environment, the camera system 320 collects a set of visual data about the environment and sends it to the detection module 430. From the visual data, the detection module 430 determines the surface type for an area of the environment, either by referencing the map or by comparing the collected visual data to stored visual data from a surface database. In some embodiments, the detection module 430 may remove or disregard objects other than the surface in order to focus on the visual data of the ground that may indicate a mess. The detection module 430 analyzes the surface in the visual data pixel-by-pixel for pixels that do not match the pixels of the surface type of the area. For areas with pixels that do not match the surface type, the detection module 430 segments out the area from the visual data using a binary mask and compares the segmented visual data to the long-term level of the map. In some embodiments, since the lighting when the segmented visual data was taken may be different from the lighting of the visual data in the map, the detection module 430 may normalize the segmented visual data for the lighting. For areas within the segmented visual data where the pixels do not match the map, the detection module 430 flags the area as containing a mess and sends the segmented visual data, along with the location of the area on the map, to the task module 440, which is described below. In some embodiments, the detection module 430 uses a neural network for detecting dust in the segmented visual data.

For each detected mess, the detection module 430 verifies that the surface type for the area of the mess matches the tagged surface type in the map for that area. In some embodiments, if the surface types do not match to within a confidence threshold, the detection module 430 re labels the surface in the map with the newly detected surface type. In other embodiments, the detection module 430 requests that the autonomous vacuum 100 collect more visual data to determine the surface type to determine the surface type of the area.

The detection module 430 may also detect messes and requested cleaning tasks via user interactions from a user in the environment. As the autonomous vacuum 100 moves around the environment, the sensor system 118 captures ambient audio and visual data using the microphone 330 and the camera system 320 that is sent to the detection module 430. In one embodiment, where the microphone 330 is an array of microphones 330, the detection module 330 may process audio data from each of the microphones 330 in conjunction with one another to generate one or more beamformed audio channels, each associated with a direction (or, in some embodiments, range of directions). In some embodiments, the detection module 430 may perform image processing functions on the visual data by zooming, panning, de-warping.

When the autonomous vacuum 100 encounters a person in the environment, the detection module 430 may use face detection and face recognition on visual data collected by the camera system 320 to identify the person and update the person's fingerprint in the fingerprint database 440. The detection module 430 may use voice print identification on a user speech input a person (or user) to match the user speech input to a fingerprint and move to that user to receive further instructions. Further, the detection module 430 may parse the user speech input for a hotword that indicates the user is requesting an action and process the user speech input to connect words to meanings and determine a cleaning task. In some embodiments, the detection module 430 also performs gesture recognition on the visual data to determine the cleaning task. For example, a user may ask the autonomous vacuum 100 to "clean up that mess" and point to a mess within the environment. The detection module 430 detects and processes this interaction to determine that a cleaning task has been requested and determines a location of the mess based on the user's gesture. To detect the location of the mess, the detection module 430 obtains visual data describing the user's hands and eyes from the object module 405 and obtains an estimated 3D rendering of the user's hands and eyes from 3D module 410 to create a virtual 3D ray. The detection module 430 intersects the virtual 3D ray with an estimate of the ground plane to determine the location the user is pointing to. The detection module 440 sends the cleaning task (and location of the mess) to the task module 440 to determine a mess type, surface type, actions to remove the mess, and cleaning settings, described below.

In some embodiments, the detection module 430 may apply a neural network to visual data of the environment to detect dirt in the environment. In particular, the detection module 430 may receive real-time visual data captured by the sensor system 118 (e.g., camera system and/or infrared system) and input the real-time visual data to the neural network. The neural network outputs a likelihood that the real-time visual data includes dirt, and may further output likelihoods that the real-time visual data includes dust and/or another mess type (e.g., a pile or spill) in some instances. For each of the outputs from the neural network, if the likelihood for any mess type is above a threshold, the detection module 430 flags the area as containing a mess (i.e., an area to be cleaned).

The detection module 430 may train the neural network on visual data of floors. In some embodiments, the detection module 430 may receive a first set of visual data from the sensor system 118 of an area in front of the autonomous vacuum 100 and a second set of visual data of the same area from behind the autonomous vacuum 100 after the autonomous vacuum 100 has cleaned the area. The autonomous vacuum 100 can capture the second set of visual data using cameras on the back of the autonomous vacuum or by turning around to capture the visual data using cameras on the front of the autonomous vacuum. The detection module 430 may label the first and second sets of visual data as "dirty" and "clean," respectively, and train the neural network on the labeled sets of visual data. The detection module 430 may repeat this process for a variety of areas in the environment to train the neural network for the particular environment or for a variety of surface and mess types in the environment.

In another embodiment, the detection module 430 may receive visual data of the environment as the autonomous vacuum 100 clean the environment. The detection module 430 may pair the visual data to locations of the autonomous vacuum 100 determined by the mapping module 400 as the autonomous vacuum moved to clean. The detection module 430 estimates correspondence between the visual data to pair visual data of the same areas together based on the locations. The detection module 430 may compare the paired images in the RGB color space (or any suitable color or high-dimensional space that may be used to compute distance) to determine where the areas were clean or dirty and label the visual data as "clean" or "dirty" based on the comparison. Alternatively, the detection module 430 may compare the visual data to the map of the environment or to stored visual data for the surface type shown in the visual data. The detection module 430 may analyze the surface in the visual data pixel-by-pixel for pixels that do not match the pixels of the surface type of the area and label pixels that do not match as "dirty" and pixels that do match as "clean." The detection module 430 trains the neural network on the labeled visual data to detect dirt in the environment.

In another embodiment, the detection module 430 may receive an estimate of the ground plane for a current location in the environment from the 3D module 410. The detection module 430 predicts a texture of the floor of the environment based on the ground plane as the autonomous vacuum 100 moves around and labels visual data captured by the autonomous vacuum 100 with the floor texture predicted while the autonomous vacuum 100 moves around the environment. The detection module 430 trains the neural network on the labeled visual data to predict if a currently predicted floor texture maps to a previously predicted floor texture. The detection module 430 may then apply the neural network to real-time visual data and a currently predicted floor texture, and if the currently predicted floor texture does not map a previously predicted floor texture, the detection module 430 may determine that the area being traversed is dirty.

The task module 440 determines cleaning tasks for the autonomous vacuum 100 based on user interactions and detected messes in the environment. The task module 440 receives segmented visual data from the detection module 430 the location of the mess from the detection module 430. The task module 440 analyzes the segmented visual data to determine a mess type of the mess. Mess types describe the type and form of waste that comprises the mess and are used to determine what cleaning task the autonomous vacuum 100 should do to remove the mess. Examples of mess types include a stain, dust, a liquid spill, a solid spill, and a smudge and may be a result of liquid waste, solid waste, or a combination of liquid and solid waste.

The task module 440 retrieves the surface type for the location of the mess from the map database and matches the mess type and surface type to a cleaning task architecture that describes the actions for the autonomous vacuum 100 to take to remove the mess. In some embodiments, the task module 440 uses a previous cleaning task from the task database for the given mess type and surface type. In other embodiments, the task module 440 matches the mess type and surfaces to actions the autonomous vacuum 100 can take to remove the mess and creates a corresponding cleaning task architecture of an ordered list of actions. In some embodiments, the task module 440 stores a set of constraints that it uses to determine cleaning settings for the cleaning task. The set of constraints describe what cleaning settings cannot be used for each mess type and surface type and how much force to apply to clean the mess based on the surface type. Cleaning settings include height of the cleaning head 140 and rotation speed of the brush roller 135 and the use of solvent 160. For example, the set of constraints may indicate that the solvent 160 can be used on wood and tile, but not on carpet, and the height of the cleaning head 140 must be at no more than 3 centimeters off the ground for cleaning stains in the carpet but at least 5 centimeters and no more than 7 centimeters off the ground to clean solid waste spills on the carpet.

Based on the determined actions and the cleaning settings for the mess, the task module 440 adds a cleaning task for each mess to task list database 450. The task list database 450 stores the cleaning tasks in a task list. The task list database 450 may associate each cleaning task with a mess type, a location in the environment, a surface type, a cleaning task architecture, and cleaning settings. For example, the first task on the task list in the task list database 450 may be a milk spill on tile in a kitchen, which the autonomous vacuum 100 may clean using solvent 160 and the brush roller 135. The cleaning tasks may be associated with a priority ranking that indicates how to order the cleaning tasks in the task list. In some embodiments, the priority ranking is set by a user via a client device 310 or is automatically determined by the autonomous vacuum 100 based on the size of the mess, the mess type, or the location of the mess. For example, the autonomous vacuum 100 may prioritize cleaning tasks in heavily trafficked areas of the environment (i.e., the living room of a house over the laundry room) or the user may rank messes with liquid waste with a higher priority ranking than messes with solid waste.

In some embodiments, the task module 440 adds cleaning tasks to the task list based on cleaning settings entered by the user. The cleaning settings may indicate which cleaning tasks the user prefers the autonomous vacuum 100 to complete on a regular basis or after a threshold amount of time has passed without a mess resulting in that cleaning task occurring. For example, the task module 440 may add a carpet deep cleaning task to the task list once a month and a hard wood polishing task to the task list if the hard wood has not been polished in more than some predetermined time period, e.g., 60 days.

The task module 440 may add additional tasks to the task list if the autonomous vacuum 100 completes all cleaning tasks on the task list. Additional tasks include charging at the docking station 190, processing visual data for the map via the mapping module 400 at the docking station 190, which may be done in conjunction with charging, and moving around the environment to gather more sensor data for detecting messes and mapping. The task module 440 may decide which additional task to add to the task list based on the amount of charge the battery 126 has or user preferences entered via a client device 310.

The task module 440 also determines when the autonomous vacuum 100 needs to be charged. If the task module 440 receives an indication from the battery 126 that the battery is low on power, the task module adds a charging task to the task list in the task list database 450. The charging task indicates that the autonomous vacuum 100 should navigate back to the docking station 190 and dock for charging. In some embodiments, the task module 440 may associate the charging task with a high priority ranking and move the charging task to the top of the task list. In other embodiments, the task module 440 may calculate how much power is required to complete each of the other cleaning tasks on the task list and allow the autonomous vacuum 100 to complete some of the cleaning tasks before returning to the docking station 190 to charge.

The navigation module 460 determines the location of the autonomous vacuum 100 in the environment. Using real-time sensor data from the sensor system 118, the navigation module 460 matches the visual data of the sensor data to the long-term level of the map to localize the autonomous vacuum 100. In some embodiments, the navigation module 460 uses a computer vision algorithm to match the visual data to the long-term level. The navigation module 460 sends information describing the location of the autonomous vacuum 100 to other modules within the controller 124. For example, the detection module 430 may use the location of the autonomous vacuum 100 to determine the location of a detected mess.

The navigation module 460 uses the immediate level of the map to determine how to navigate the environment to execute cleaning tasks on the task list. The immediate level describes the locations of objects within a certain vicinity of the autonomous vacuum 100, such as within the field of view of each camera in the camera system 320. These objects may pose as obstacles for the autonomous vacuum 100, which may move around the objects or move the objects out of its way. The navigation module interlays the immediate level of the map with the long-term level to determine viable directions of movement for the autonomous vacuum 100 based on where objects are not located. The navigation module 460 receives the first cleaning task in the task list database 450, which includes a location of the mess associated with the cleaning task. Based on the location determined from localization and the objects in the immediate level, the navigation module 100 determines a path to the location of the mess. In some embodiments, the navigation module 460 updates the path if objects in the environment move while the autonomous vacuum 100 is in transit to the mess. Further, the navigation module 460 may set the path to avoid fragile objects in the immediate level (e.g., a flower vase or expensive rug).

The logic module 470 determines instructions for the controller 124 to control the autonomous vacuum 100 based on the map in the map database 415, the task list database 450, and the path and location of the autonomous vacuum 100 determined by the navigation module 460. The instructions describe what each physical feature of the autonomous vacuum 100 should do to navigate an environment and execute tasks on the task list. Some of the physical features of the autonomous vacuum 100 include the brush motor 140, the side brush motor 150, the solvent pump 175, the actuator assembly 138, the vacuum pump 115, and the wheels 210. The logic module 470 also controls how and when the sensor system 118 collects sensor data in the environment. For example, logic module 470 may receive the task list from the task list database 450 and create instructions on how to navigate to handle the first cleaning task on the task list based on the path determined by the navigation module, such as rotating the wheels 210 or turning the autonomous vacuum 100. The logic module may update the instructions if the navigation module 460 updates the path as objects in the environment moved. Once the autonomous vacuum 100 has reached the mess associated with the cleaning task, the logic module 470 may generate instructions for executing the cleaning task. These instructions may dictate for the actuator assembly 138 to adjust the cleaning head height, the vacuum pump 115 to turn on, the brush roller 135 and/or side brush roller 154 to rotate at certain speeds, and the solvent pump 120 to dispense an amount of solvent 160, among other actions for cleaning. The logic module 470 may remove the cleaning task from the task list once the cleaning task has been completed and generate new instructions for the next cleaning task on the task list.

Further, the logic module 470 generates instructions for the controller 124 to execute. The instructions may include internal instructions, such as when to tick a clock node or gather sensor data, or external instructions, such as controlling the autonomous vacuum 100 to execute a cleaning task to remove a mess. The logic module 470 may retrieve data describing the map of the environment stored in the map database 415, fingerprint database 420, and task list database 450, or from other modules in the controller 124, to determine these instructions. The logic module 470 may also receive alerts/indications from other components of the autonomous vacuum 100 or from an external client device 310 that it uses to generate instructions for the controller 124. The logic module 470 may also send sensor data to one or more of the modules and send indications to the one or more modules when the autonomous vacuum is traversing in the environment, a real-time location of the autonomous vacuum 100, and the like.

It is appreciated that although FIG. 4 illustrates a number of modules according to one embodiment, the precise modules and resulting processes may vary in different embodiments. For example, in some embodiments, the controller 124 may include a cleaning module that controls the autonomous vacuum 100 to complete cleaning tasks. The cleaning module may control functions of the cleaning head 140, such as controlling the brush motor 140 and the side brush motor 150 to change the speed of the brush roller 135 and side brush roller 154, respectively. The cleaning module may also control a speed of the autonomous vacuum 100 and speed of the solvent pump 120. The cleaning module may also control how the autonomous vacuum 105 moves to clean up a mess and ingest waste 155 and move the autonomous vacuum 105 to retrieve any waste 155 that may have moved during execution of the cleaning task.

The surface detection module 480 determines characteristics of surface types in an environment. Characteristics of a surface type may include, for example, material (e.g., marble, ceramic, oak, nylon, etc.), placement pattern (e.g., stacked squares, interlocking rectangles, etc.), grain/weave (e.g., density, visual texture and color variation), texture (shag, glossy, etc.), and color. The surface detection module 480 may determine the characteristics of the surface types of the environment in real-time or based on visual-inertial data saved in relation to the map of the environment.

In some embodiments, the surface detection module 480 receives real-time visual-inertial data of an environment from the logic module 470 as the autonomous vacuum 100 traverses the environment. The surface detection module 480 may also receive a real-time location of the autonomous vacuum in the environment from the logic module 470 and retrieve a surface type of the location based on the map stored in the map database 414. In other embodiments, the surface detection module 480 accesses visual-inertial data for a location of the environment corresponding to a surface type from the map database 414.

The surface detection module 480 analyzes the visual-inertial data to determine characteristics of the surface type. In some embodiments, the surface detection module 480 compares the visual data to images of a plurality of floors with the same surface type and selects characteristics of a floor with an image that is most similar to the visual data. In other embodiments, the surface detection module 480 inputs the visual data and surface type to a machine learning model configured to identify characteristics for a surface type. The machine learning model may output a likelihood for each characteristic of a plurality of characteristics that the floor depicted in the visual data includes the characteristic. The surface detection module 480 may compare the likelihoods to a threshold likelihood and select characteristics with a likelihood higher than the threshold likelihood for the surface type at the location. The surface detection module 480 may store the characteristics in association with the surface type and location in the map of the environment.

The machine learning model may be trained on image data labeled with characteristics of a surface type associated with the image data. For example, the machine learning model may be trained on a plurality of images of different floorings, each labeled with a surface type and characteristics. For instance, a first set of image data may be labeled with the surface type "tile" and the characteristics "porcelain," "plank pattern," "glossy," and "black." A second set of image data may be labeled with the surface type "tile" and the characteristics "porcelain," "plank pattern," "wood grain," "wood texture," and "natural white." Though both floorings in these sets of image data are of the surface type "tile," the floorings have some characteristics that differ. The surface detection module 480 may store and train the machine learning model on sample image data of floorings received from a plurality of external flooring systems or external builders and contractors via an API presented at a client device 310.

The surface detection module 480 may also analyze the inertial data to augment the characteristics of the surface types store of the environment. For instance, surface detection module 480 may determine, based on the inertial data, that the autonomous vacuum 100 moves more quickly over the surface type "tile" than the surface type "carpet." The surface detection module 480 may build an understanding of how the autonomous vacuum 100 moves on different surface types and compare its understanding to the captured inertial data. For instance, the surface detection module 480 may determine that the autonomous vacuum typically moves at a speed of 10 miles per hour on rugs when a specific torque (or power) is applied to motors of the wheels. As the autonomous vacuum 100 traverses the environment, the surface detection module 480 may compare a real-time speed of the autonomous vacuum 100 as the specific torque is applied to the motors to recorded speeds for locations of the environment. The surface detection module 480 determines whether the speed at a location varies by more than a threshold percentage from a recorded speed, and if so, the surface detection module 480 determines that the surface type may have changed. In such instances, the surface detection module 480 may redetermine the surface type at the location and update the map in the map database 414. In another example, the surface detection module 480 may compare the torque required to make the autonomous vacuum 100 go a certain speed (e.g., 2 miles per hour) to the specific torque stored in relation to that location and speed for the autonomous vacuum 100. If the torque varies by more than a threshold percentage, the surface detection module 480 may redetermine the surface type of the location.

The surface detection module 480 also may determine a height of each surface type in the environment, e.g., by analyzing surface type or measuring distance from a ground plane to top canopy of surface. The surface detection module 480 may transmit (or send) an indication to the logic module 470 to lower the height of the cleaning head 140 to be resting on a surface at a location in the environment. The surface detection module 480 may determine, based on sensor data of the from the sensor system 118 via the logic module 470, a height of the wheels of the autonomous vacuum 100 and a height of the cleaning head 140. For example, the surface detection module 480 may determine the height of the wheels based on IMU data and the height of the cleaning head 140 based on visual data. The surface detection module 480 may store the height of the wheel and cleaning head 140 in relation to the location in the map database 414. In some embodiments, the surface detection module 480 may use the height of the cleaning head 140 and the wheels to determine boundaries between surface types in the environment. For example, on a dense (or thick) carpet, the cleaning head 140 may be at a height above the carpet while the wheels may be at a height below the carpet (due to the autonomous vacuum 100 sinking into the carpet). The cleaning head 140 may move up in height as the cleaning head 140 is moved over a rug on top of the carpet, while the wheels may move up the same amount in height as the wheels move over the rug. The surface detection module 480 may detect such change in height of the wheels and cleaning head 140 and store information corresponding to the location of the height change in the map database 414 as indicating a boundary between surface types.

The surface detection module 480 may store cleaning information in the map database 414 in association with each surface type. The cleaning information may include a particular fan speed, a particular noise level, a list of which components of the autonomous vacuum 100 should be used to clean the surface type, and the like. The surface detection module 480 may retrieve the cleaning information from external flooring systems associated with the surface type or external builders and contractors who entered the cleaning information via the API on a client device 310. For example, cleaning instructions for the surface type "carpet" may indicate to use an internal fan of the autonomous vacuum and cleaning information for the surface type "wood" may indicate to operate components of the autonomous vacuum 100 at a lower volume than for the surface type "rug." The surface detection module 480 may communicate the cleaning information to the logic module 470 such that the logic module may use the cleaning information to determine how to control components of the autonomous vacuum 100 for cleaning.

In some embodiments, the surface detection module 480 receives real-time visual data of the environment and determines how to clean an area of the environment based on the surface type. In particular, the surface detection module 480 receives mess types detected in the section from the detection module 430 and/or task module 440. Alternatively, the surface detection module 480 may input the visual-inertial data of the environment along with the surface type to a machine learning model trained to detect messes of different mess types. The machine learning model may be trained on visual data of a plurality of surface types each labeled with the surface type and which pixels correspond to messes and of what mess types.

The machine learning model outputs a likelihood that the visual data includes a mess and likelihoods representing which mess type is shown. The surface detection module 480 compares the likelihood of including mess to a mess threshold, and if the threshold is exceeded, compares the likelihoods representing the mess types to a mess type threshold. The surface detection module 480 selects mess types associated with likelihoods over the mess type threshold. The surface detection module 480 accesses cleaning information for the determined surface type and mess type and sends the cleaning information to the logic module 470 to control the autonomous vacuum 100 to execute techniques based on the cleaning information. For instance, for a mess type of "spilled crumbs," the cleaning information may indicate to vacuum over the mess and subsequently mop over the mess, which the flooring module may instruct the logic module 470 to control the autonomous vacuum 100 to do.

The surface detection module 480 may monitor the characteristics of the surface types in the environment as the autonomous vacuum 100 traverses the environment. For instance, the surface detection module 480 may use the machine learning model on image data captured in real-time of the environment and compare the characteristics determined by the machine-learning model to the characteristics stored from a corresponding location in the map database 414. If the surface detection module 480 detects a discrepancy in characteristics (e.g., new or missing characteristics), the surface detection module 480 may determine whether the autonomous vacuum 100 is traversing a boundary between surface types I the environment based on the height of the cleaning head and wheels and/or the visual data. The surface detection module 480 may redetermine the surface type for the location and update the map database 414 to indicate the surface type. The surface detection module 480 may send an indication of the boundary and/or redetermined surface type of the user interface module 490.

Figure 7:
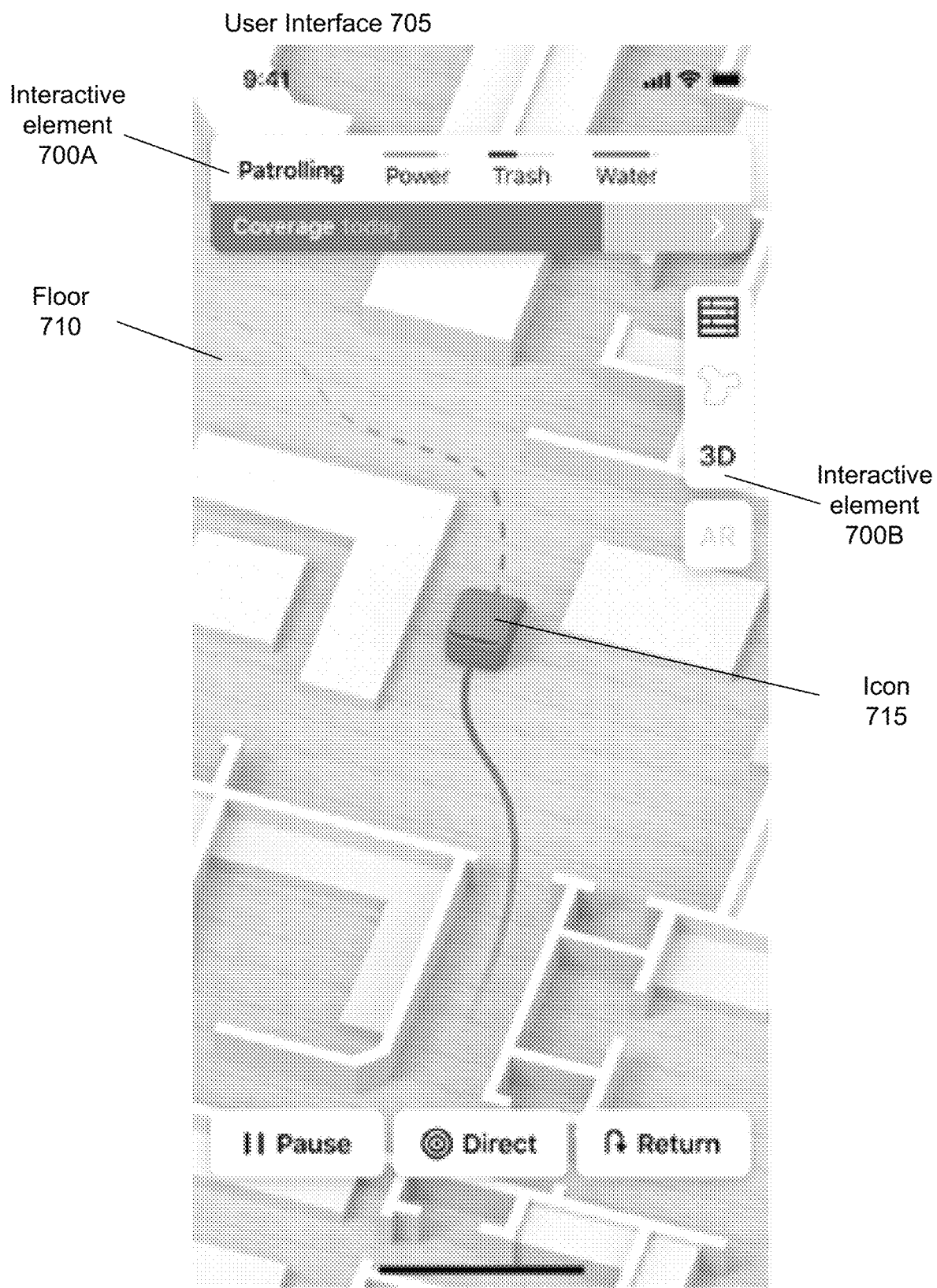
FIG. 7 illustrates a user interface depicting a virtual rendering of the autonomous vacuum in an environment, according to one example embodiment.

The user interface module 490 generates user interfaces for the client devices 320 and display 122. The user interfaces (or APIs) may include renderings of the environment, including meses, obstacles, and the like, retrieved from the map database 414. A rendering may be shown as a top-down view of the environment including representations of each surface type in corresponding areas of the environment. The user interfaces may also include a plurality of interactive elements that a user may interact with to control movement of the autonomous vacuum 100 and view sensor data captured by the autonomous vacuum 100. Examples of user interfaces are shown in FIGS. 7-8B. The user interface module 490 generated and transmits user interfaces in response to receiving indications from the client devices 320 and/or display 122 and updates the user interfaces based on interactions received from the client devices 320 and/or display 122.

The user interface module 490 may generate user interfaces that depict a surface type in a background. For instance, the user interface module 490 may receive a real-time location of the autonomous vacuum 100 from sensor system 118 via the logic module 470. The user interface module 490 may retrieve, from the map database 414, a surface type and characteristics of the location. The user interface module 490 may also receive real-time visual data off the surface type at or around the location from the sensor system 118 via the logic module 470. The user interface module 490 may insert a portion of image data corresponding to the surface type to a user interface as the background of the user interface. In some embodiments, the user interface module 490 may align the portion of image data to match an orientation of the pattern of the surface type in the real-time visual data. For instance, the background of the user interface may depict the surface type with a pattern in the same orientation as seen by a camera at the front 200 of the autonomous vacuum 100.

The user interface module 490 may layer interactive elements (or icons) on top of the background. In some embodiments, the interactive elements may remain stationary over the background of the user interface as the background renders a scroll animation, as described above. The interactive elements receive interactions from a user via the user interface that indicate to instruct the autonomous vacuum 100 and/or request data about the autonomous vacuum's 100 cleaning in the environment. In some embodiments, the user interface module 490 may alternately or additionally insert an element indicating the surface type to the user interface.

In some embodiments, the user interface module 490 may configure the image of the surface type in the background to slide within the background based on movement of the autonomous vacuum 100. For instance, the user interface module 490 may determine a real-time speed of the autonomous vacuum from IMU, motor, and/or visual data captured by the sensor system 118 and sent to the user interface module 490 via the logic module 470. The user interface module 490 may configure the image data of the background to be animated at a speed that is linearly related to the real-time speed. The user interface module 490 may further configure the image data in the background to mirror an alignment of flooring in the environment based on real-time image data of the environment. For example, the user interface module may align grout lines from the image data in the background with grout lines in the real-time image data, such that the patterns shown in the background and the real-time image data match. In another example, the user interface module 490 may determine an orientation of fibers in a carpet and align image data of the carpet in the background of the user interface to match real-time image data of the carpet captured at the front 200 of the autonomous vacuum 100.

In some embodiments, the user interface module 490 includes one or more interactive elements for users, such as the user of the autonomous vacuum 100 or external builders or operators, to enter characteristics and cleaning information for surface types in an environment. For instance, the user interface module 490 may generate a user interface with a rendering of the environment with the floor in the rendering divided into selectable sections. Each selectable section may correspond to a surface type determined for an area of the environment. The user interface module 414 may receive a selection of a selectable section and insert information about the surface type and characteristics of the area with the surface type in the user interface. The user interface module 414 may also add one or more text boxes or selectable lists to the user interface that a use may interact with to add more characteristics and cleaning information to the map database 414 for the surface type and section. For instance, a contractor may change a surface type and characteristics of the section after replacing flooring in the environment.

In some embodiments, the user interface module 414 may communicate with a camera of the client device 310 presenting the user interface to receive machine-readable codes. The user interface module 414 may communicate the machine-readable codes to external systems (e.g., the Internet) to collet information associated with the machine-readable codes (e.g., characteristics and cleaning information. For example, a contractor, after renovating the environment by replacing carpet with tile, selects an area of the environment in a rendering presented the user interface. The user interface module 490 receives the selection and edits the user interface to include a scan icon that communicates with a camera of a client device 310 presenting the user interface. The contractor may scan, using the scan icon, a machine-readable code associated with the tile. The user interface module 414 receives the machine-readable code and retrieves information about the tile from a website associated with the machine-readable code. The user interface module 414 updates the map of the environment to include the surface type (e.g., "tile") and characteristics and cleaning information from the retrieved information.

In some embodiments, the user interface module 490 may generate a user interface including a joystick element that is configured to receive interactions corresponding to desired movements of the autonomous vacuum 100. For example, the user interface module 490 may receive an interaction from the joystick element indicating movement to the left and communicate with the logic module 470 to move the autonomous vacuum 100 to the left tin the environment. The user interface module 490 may compare movements corresponding to interactions with the joystick button to the map of the environment based on a real-time location of the autonomous vacuum 100. If a movement would lead to an error for the autonomous vacuum 100 (e.g., surpassing a virtual border, hitting a wall, running the mop roller on carpet, etc.), the user interface module 490 may send an alert of the error via the user interface rather than proceeding to instruct the logic module 470 based on the movement.

The user interface may also include one or more interactive elements for manually controlling other components of the autonomous vacuum, such as the cleaning rollers, solvent pump 120, vacuum pump 115, actuator assembly 138, and sensors of the sensor system 118. For example, the user interface module 490 may receive an interaction with a mop roller button via the user interface and send an indication to the logic module 470 to activate a mop roller of the autonomous vacuum 100. The user interface may also include interactive elements for controlling a noise level emitted by the autonomous vacuum 100 during cleaning. For instance, the user interface module 490 may include an interactive slider configured to raise or lower the noise emitted from the autonomous vacuum 100 during operation as the interactive slider is slid to one direction or the other, respectively. The user interface module 490 may communicate with the logic module 470 to control the noise of components of the autonomous vacuum 100 and may send notifications via the user interface regarding change sin noise level.

Figure 5:
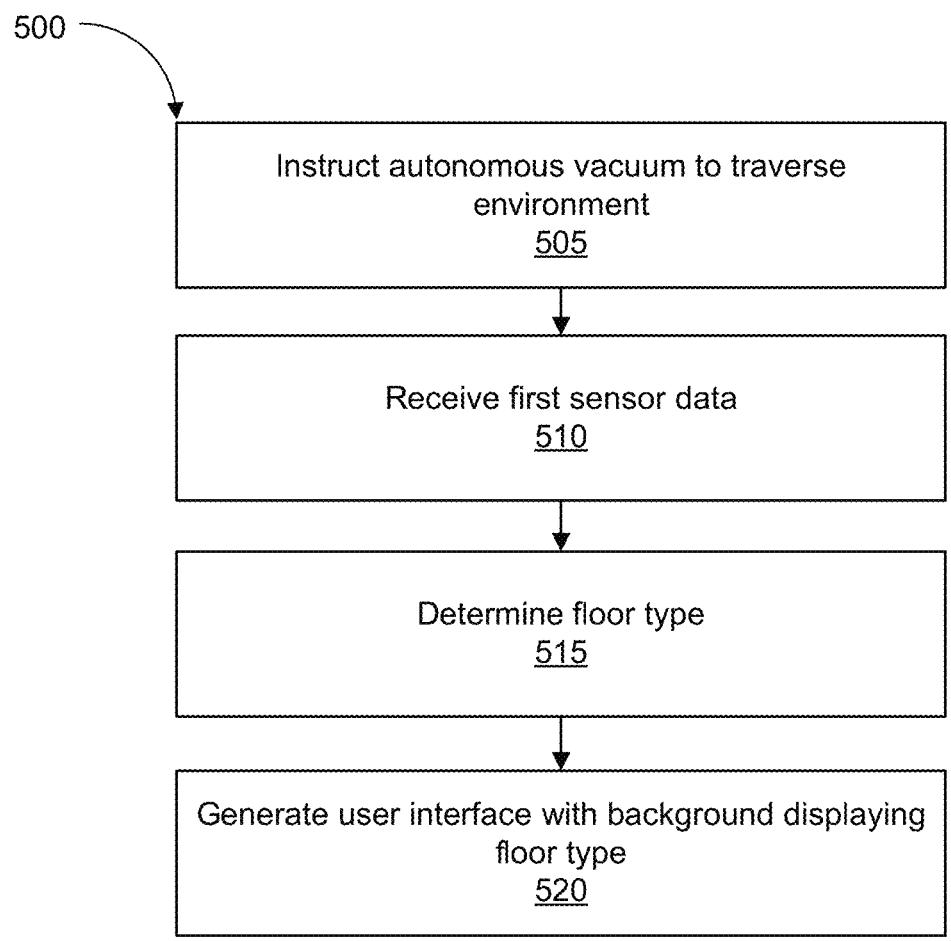
FIG. 5 is a flowchart illustrating an example process for generating a user interface with a background displaying a surface type, according to one example embodiment.

FIG. 5 is a flowchart illustrating an example process for generating a user interface with a background displaying a surface type, according to one example embodiment. The controller 124 of the autonomous vacuum 100 may cause the autonomous vacuum 100 to traverse an environment. The environment may include a plurality of surface types on a surface of the environment. For instance, an environment may include white oak wood floor and a navy wool rug in a weave pattern. The controller 124 may instruct 505 the autonomous vacuum 100 to move to a specific location in the environment or to scout in the environment to identify messes for cleaning. The surface detection module 480 receives 510 first sensor data (e.g., from the sensor system 118) corresponding a first set of characteristics of a first section of the floor that the autonomous vacuum 100 is traversing in real-time. The surface detection module 480 determines 515, based on the first sensor data, a first surface type of a plurality of surface types for the first section. The user interface module 490 generates 520 a first user interface with a background displaying the first surface type and transmits the user interface to a client device 310 for display. Additionally, or alternatively, the user interface module 490 transmits the user interface for presentation on the display 122.

It is appreciated that although FIG. 5 illustrates a number of interactions according to an example embodiment, the precise interactions and/or order of interactions may vary in different embodiments. For instance, in some embodiments, the surface detection module 480 receives second sensor data describing a second section of the floor from the autonomous vacuum 100 and inputs the second sensor data to a machine learning model to determine a second set of characteristics of the second section. The surface detection module 480 compares the second set of characteristics to the first set of characteristics and determines that one or more characteristics differ between the sets. In response, the surface detection module 480 determines, based on the second sensor data, a second surface type of the second section, and the user interface module 490 generates a user interface with a background displaying the second surface type.

In some embodiments, the user interface module 490 determines, based on the first sensor data, a speed of the autonomous vacuum 100 and provides the user interface with the background as a scroll animation that has a speed with a linear relationship to the speed of the autonomous vacuum 100. In other embodiments, the characteristics include a pattern and an orientation of the pattern of the surface type, and the user interface module 490 renders the background with a corresponding pattern in a similar orientation (e.g., orientated the same as the surface type int the environment).

Figure 6:
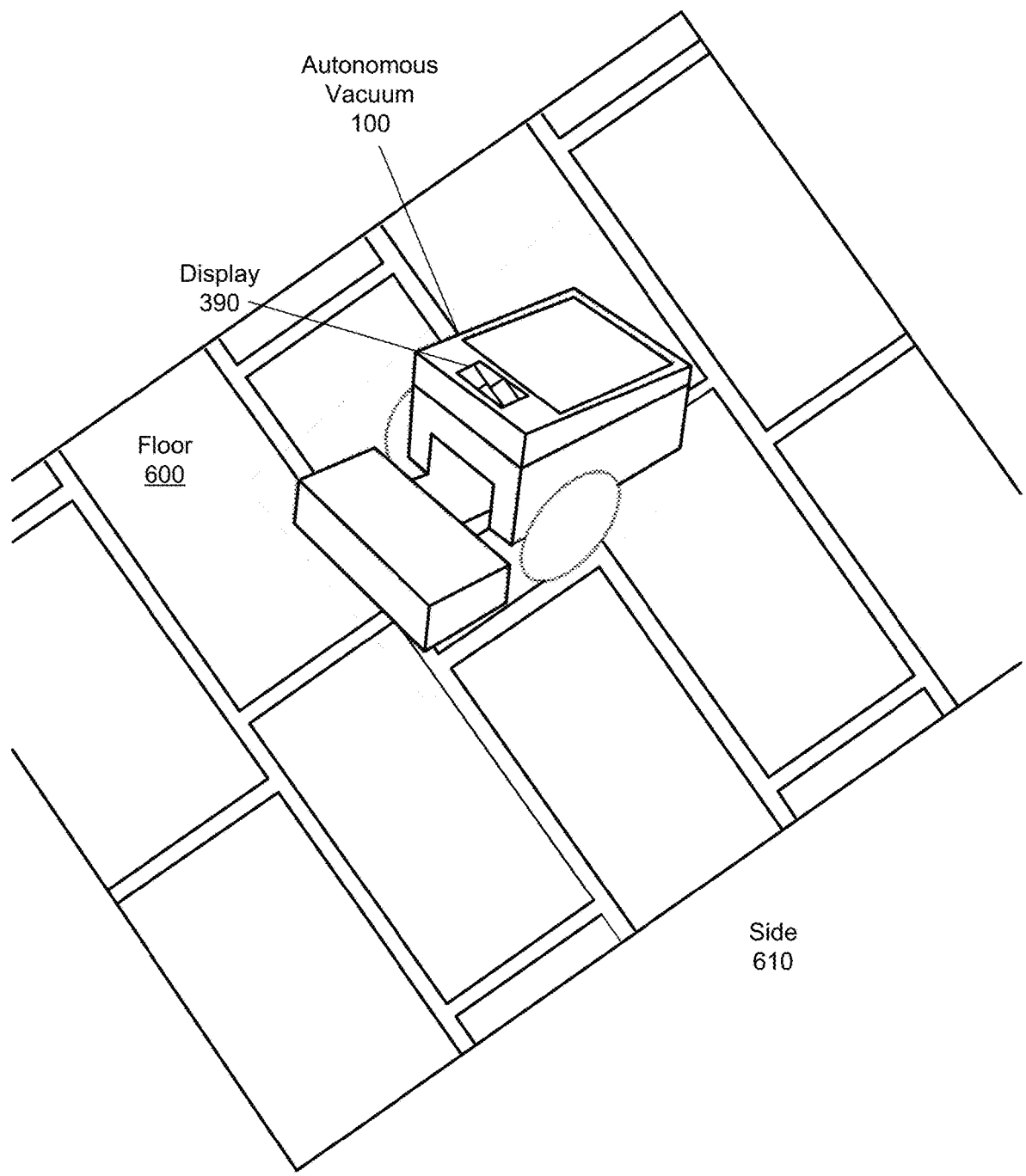
FIG. 6 is an example of an autonomous vacuum with a display, according to one example embodiment.

FIG. 6 is an example of an autonomous vacuum 100 with a display 122, according to one example embodiment. In this example, the floor 600 that autonomous vacuum 100 is on is a patterned tile layout having an alternating rectangle pattern. The display 390 of the autonomous vacuum 100 depicts user interface with a background displaying the surface type (e.g., tile) in the same pattern in a similar orientation. For instance, the tiles are laid vertically from the side 610 on the floor 600 and the rendering of tiles in the display 390 depicts tiles that appear vertically from the same side 610.

FIG. 7 illustrates a user interface 705 depicting a virtual rendering of the autonomous vacuum 100 in an environment, according to one example embodiment. The user interface 705 depicts a virtual rendering of the environment with an icon 715 representing the autonomous vacuum's real-time location in the environment. The virtual rendering includes a floor 710 displayed based on the surface type and characteristics of the floor 710 of the environment. For instance, the floor 710 of FIG. 7 is depicts a "wood" surface type. The user interface 705 includes a plurality of interactive elements 700 layered on top of the virtual rendering. The interactive elements may remain in the same location in the user interface as the virtual rendering moves to represent the real-time surroundings of the autonomous vacuum 100.

Figure 8A:
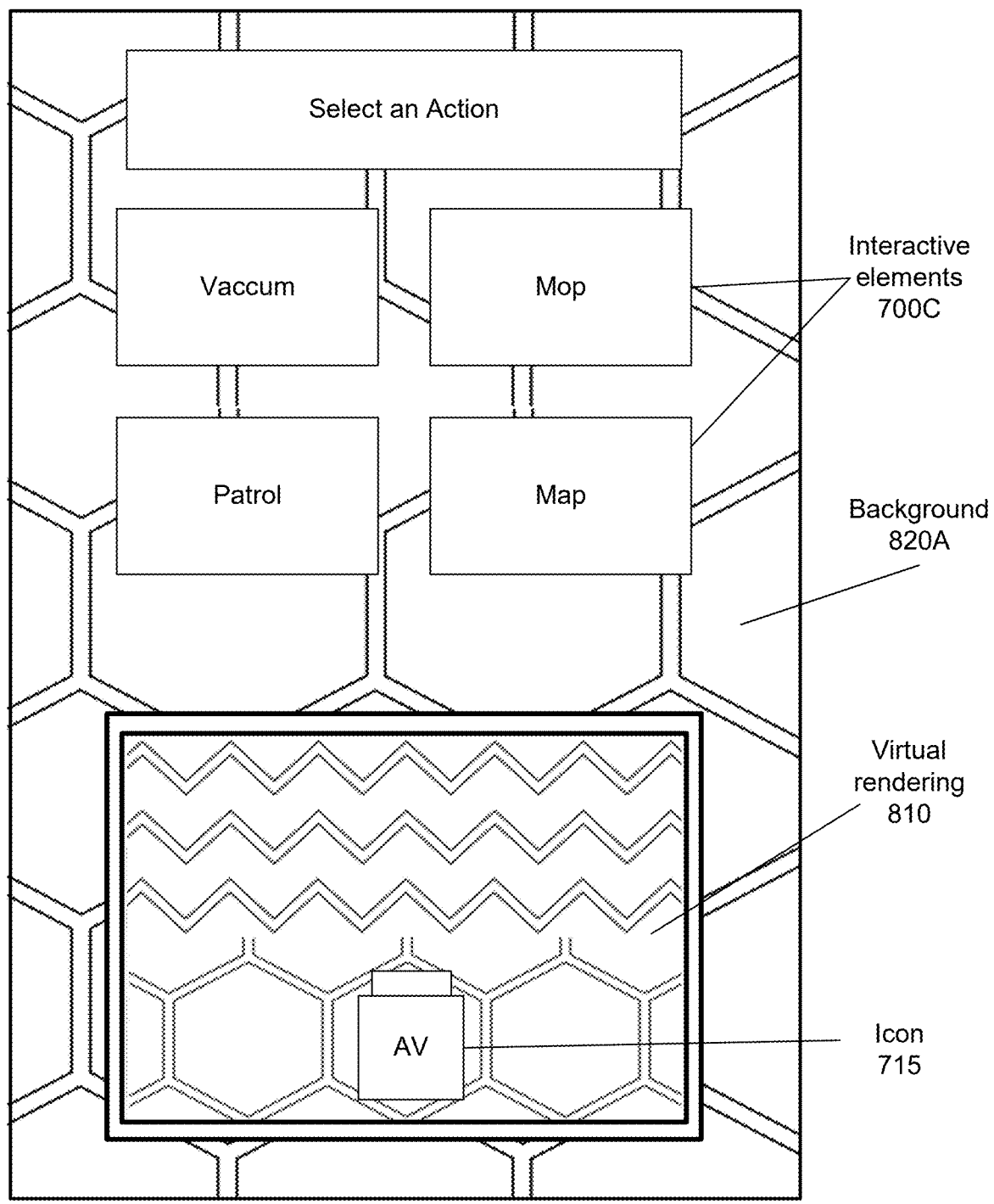
FIG. 8A illustrates a user interface depicting a virtual rendering of the autonomous vacuum in an environment, according to one example embodiment.
Figure 8B:
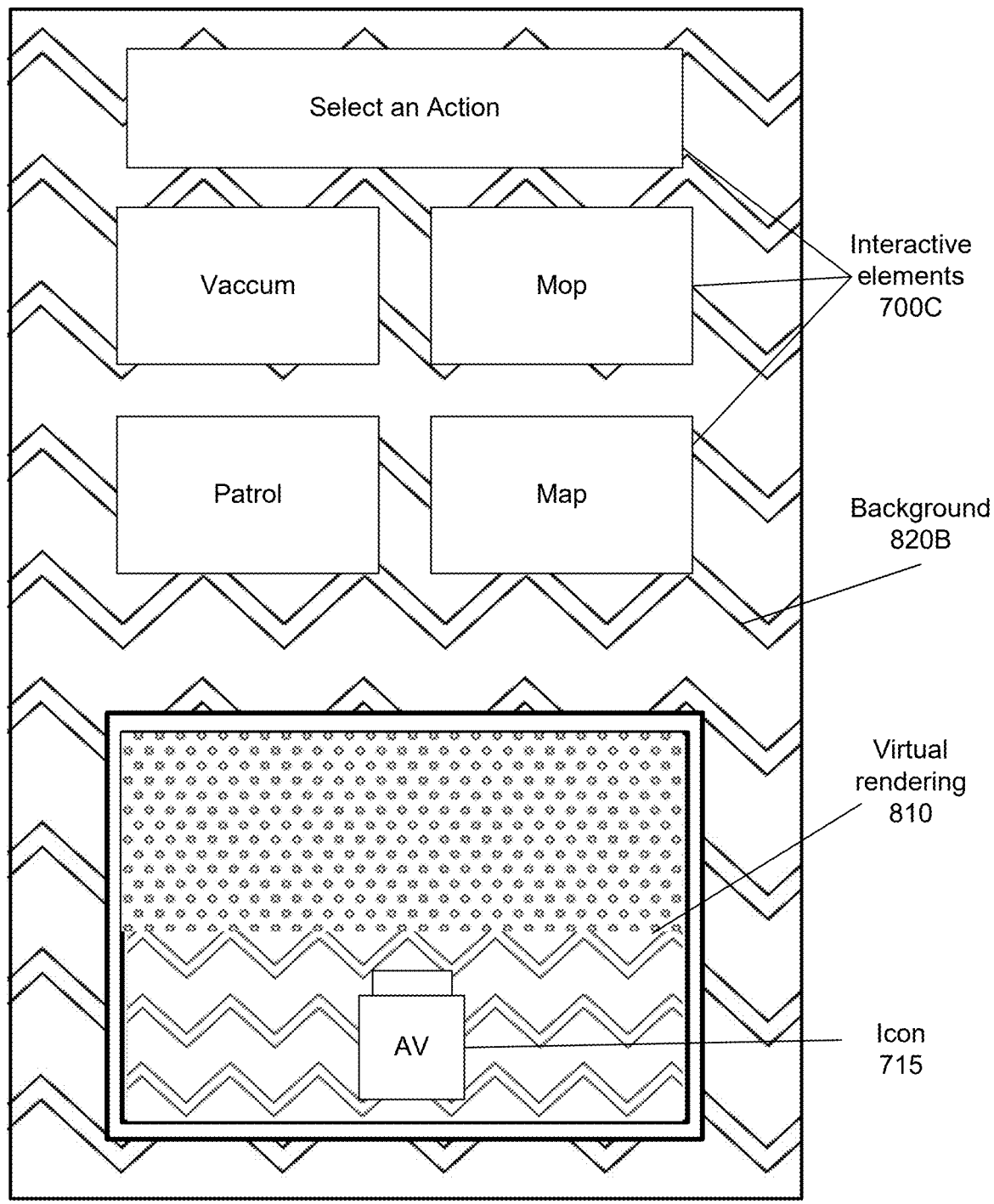
FIG. 8B illustrates a user interface depicting a virtual rendering of the autonomous vacuum in an environment, according to one example embodiment.

FIG. 8A illustrates a user interface 800A depicting a virtual rendering 810 of the autonomous vacuum 100 in an environment, according to one example embodiment. In this example, the virtual rendering 810 is shown in a box comprising a portion of the user interface 800, and the user interface also includes a plurality of interactive elements 700C that receive interactions that cause the autonomous vacuum 100 to perform actions such as vacuuming, patrolling, mapping, and mopping. The user interface 800A may be provided for display (or displayed) on a screen of a computing device, e.g., a laptop, tablet or smartphone. The background 820A of the user interface 800A represents a surface type of a real-time location of the autonomous vacuum 100 in the environment. As shown int the virtual rendering 810, the autonomous vacuum 100, represented by an icon 715, is on to of a floor with a hexagonal pattern, which is also depicted in the background 820A.

When the autonomous vacuum 100 moves to a floor with a different surface type, the background 820B is updated to reflect the different surface type. For example, as shown in FIG. 8B, the background 820B of the user interface 800B updates to depict a zigzag pattern when the autonomous vacuum 100 is on top of a floor with a zigzag pattern. In some embodiments, as the autonomous vacuum moves from one surface type to another, the background may reflect both surface types at once with an animation that is linearly related to a real-time speed of the autonomous vacuum 100.

Cleaning Head

The actuator assembly 138 of the autonomous vacuum 100 adjusts the elevation of the cleaning head 140 above the ground to account for the various surface types, overcome obstacles in the autonomous vacuum's 100 trajectory that the passive articulation alone may not be able to, clean debris that is larger than an opening of the cleaning head 140, avoid colliding or tangling with the obstacles, and cross thresholds in the environment (e.g., transitions between surface types). The actuator assembly 138 also offloads frictional load that is on the wheels (e.g., mobility system) from to the cleaning head 140 that occurs when the autonomous vacuum 100 is in a patrolling mode or when the autonomous vacuum 100 is summoned by a user for a point-and-clean use case.

Actuating the cleaning head 140 protects the autonomous vacuum 100 from high centering and losing traction on larger debris and textured surface types, like carpets and rugs. Actuating the cleaning head 140 also reduces interference between the cleaning head 140 and features of surfaces of the environment, which in turn reduces load on the mobility system and wear on the brush rollers 135, flicks away larger debris, or reduces tangles with wires and fibers.

The actuator assembly 138 is able to lift the cleaning head 140 to an elevation which the mobility system has been designed to cross over. As actuation heights for effective sweeping and mopping may be different, the actuator assembly 138 has enough resolution to maintain sufficient contact between the brush rollers 135 and a mop roller in the cleaning head 140. Too much contact increases the load on the mobility system and too little contact reduces the cleaning efficacy of the cleaning head 140. The actuator assembly 138 also retains passive articulation to account for the sudden and unforeseen irregularities in the surface at any cleaning head 140 elevation and adjust the cleaning head 140 height to any specified value reliably for the entire service life of the autonomous vacuum 100. A prime mover (actuator) of the actuator assembly 138 should also keep the cleaning head 140 actuated at a certain height for a prolonged period, and thus consume as little energy as possible to maintain that elevation.

To achieve these design goals, the actuator assembly 138 may use a prime mover, a compliant element, a transmission element, a sensing mechanism, a locking/latching mechanism, a coupling to the cleaning head 140, a control element to achieve the elevation goals, a detection system that commands actuation, and references to which the cleaning head 140 elevation will be adjusted.

Figure 9:
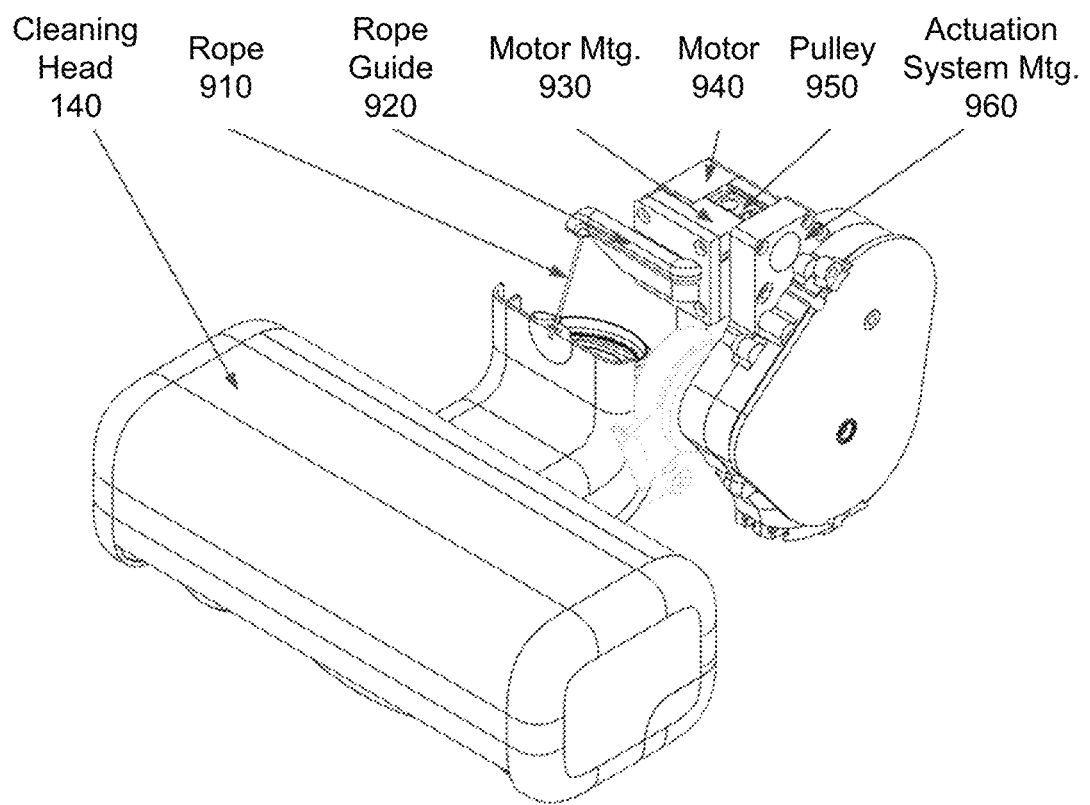
FIG. 9 illustrates a rope-based system of the autonomous vacuum, according to one example embodiment.

FIG. 9 illustrates a rope-based system of the autonomous vacuum, according to one example embodiment. For passive articulation, the cleaning head 140 is mounted on a four-bar linkage (e.g., as part of the actuator assembly 138), with a fixed link on a chassis. The cleaning head 140 has an anchor point that is attached to a rope 910. The rope 910 is the elastic element that allows the cleaning head 140 to comply with surface irregularities without actuation intervention but still transmit motion in tension to elevate the cleaning head 140 to a required position. As the cleaning head 140 travels a net circular trajectory while moving up, the rope 910 being flexible does not over-constrain motion of the cleaning head 140. The rope 910 is guided through the rope guide 920 to a pulley 950 which wraps and unwraps it to the desired position. Rope guide 920 allows the prime mover to be in a distant position from an anchor and still transmit the motion reliably. The rope guide 920 may be rigid as shown in the FIG. 9 but can also be a flexible element, like a bowden cable sleeve. The pulley 950 is coupled to a motor 940 with the worm reducer gearbox. A motor 940 acts as the prime mover, and a worm reducer helps in amplifying torque and provides the locking mechanism to hold the cleaning head 140 at any desired position without drawing any power from the battery 126. The motor 940 has a built-in encoder that tells a shaft position at any requested time and thus how much rope 910 needs to be fed/retracted to achieve a particular elevation based on a control algorithm. The rope guide 920 provides an additional advantage of constraining the rope 910 in the right plane of the autonomous vacuum 100, thus simplifying a transfer function from the actuator assembly 138 position to the cleaning head 140 position. The motor mounting 930 mounts the motor 940. The actuation system mounting 960 mounts the actuation system.

Figure 10:
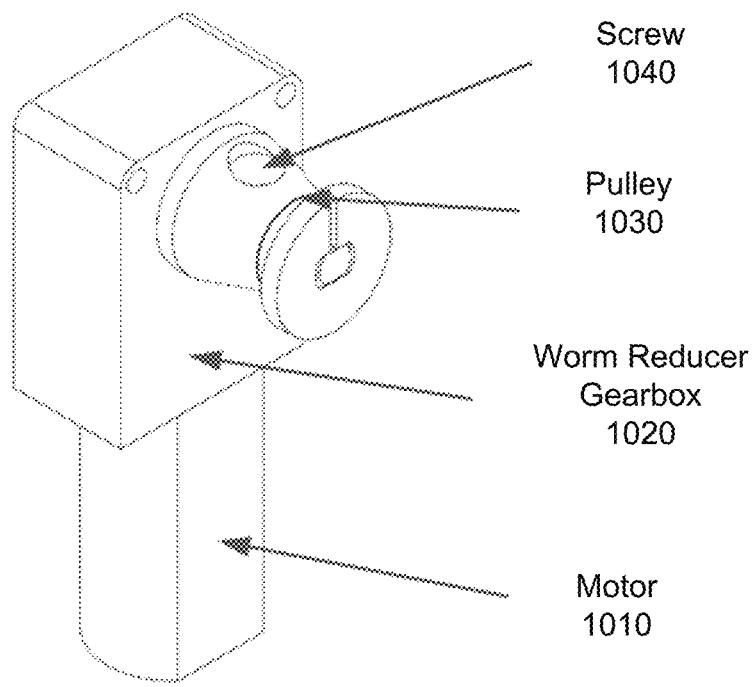
FIG. 10 illustrates a motor gearbox pulley assembly of the autonomous vacuum, according to one example embodiment.

FIG. 10 illustrates a motor gearbox pulley assembly of the autonomous vacuum, according to one example embodiment. The pulley 1030 is mounted on an output shaft of a worm reducer gearbox 1020 using a setscrew 1040, and a cone of the pulley 1030 covers the rest of the exposed output shaft. Thus, when the rope returns under tension after a slack, the rope returns to the root of the pulley 1030 and does not get tangled in the output shaft. Alternative arrangements for the worm reducer gearbox 1020 include using a crank arrangement instead of the pulley 1030 and having a ratchet on the same axis. The ratchet locks motion in the other direction when the cleaning head 140 is being maintained at a particular height. A motor 1010 drives actuation of the pulley 1030 via the worm reducer gearbox 1020.

Figure 11:
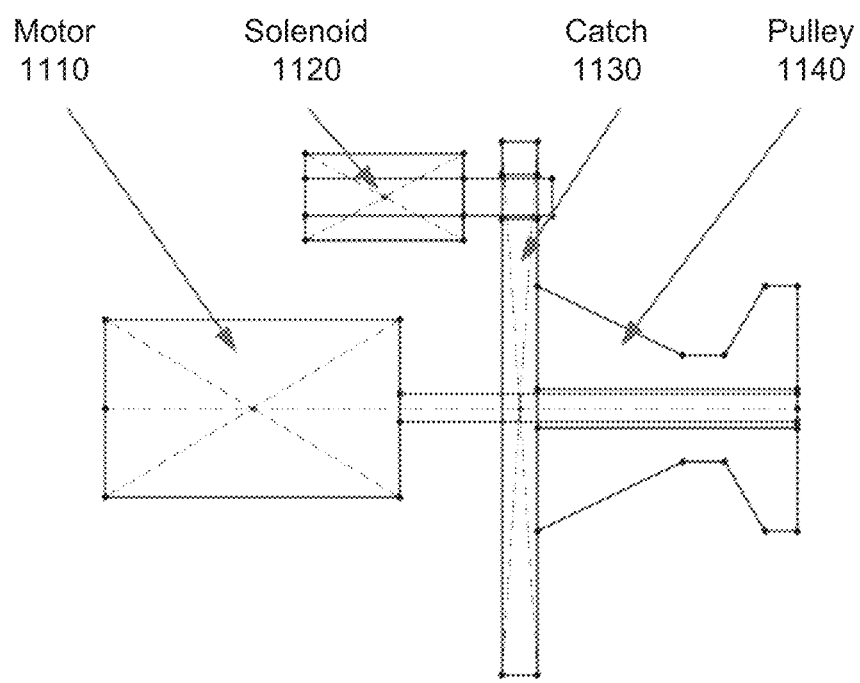
FIG. 11 illustrates a solenoid latch of the autonomous vacuum, according to one example embodiment.

FIG. 11 illustrates a solenoid latch of the autonomous vacuum, according to one example embodiment. A normally extended spring-loaded solenoid pin (or solenoid latch) may also be used as a retaining mechanism. Retention may be affected by a friction element that the solenoid 1120 actuates or an indexing wheel coupled to the pulley 1140 where the solenoid pin latches. A solenoid 1120 can be excited simultaneously or separately with a motor 1110. Simultaneous excitation ensures that the latch/brake is disengaged whenever the motor 1110 is actuated and is otherwise engaged. An advantage of the solenoid pin is that its efficiency may be improved by using an alternative to the worm reduction, though part count would increase in such cases. A catch may have a non-parallel axis to the pulley axis to allow packaging merit and/or mechanical advantage.

In FIG. 9, the rope 910 is anchored at a projection of the center of mass of the cleaning head 140 in the pivot plane, which keeps the rolling degree of freedom unconstrained. This may be solved by having two ropes attached on the ends of the cleaning head 140 and actuating the rope 910 with a single or coupled pulleys or using a separate actuator. Using multiple prime movers reduces the load on the single actuator, and thus, smaller individual actuators may be used and placed at different locations.

The pulley may have grooves for more reliable wrapping of the rope 910 when multiple turns of the pulley are required for full-scale actuation. A rope of square cross section (e.g., a ribbon) may be used for more reliable wrapping.

Figure 12:
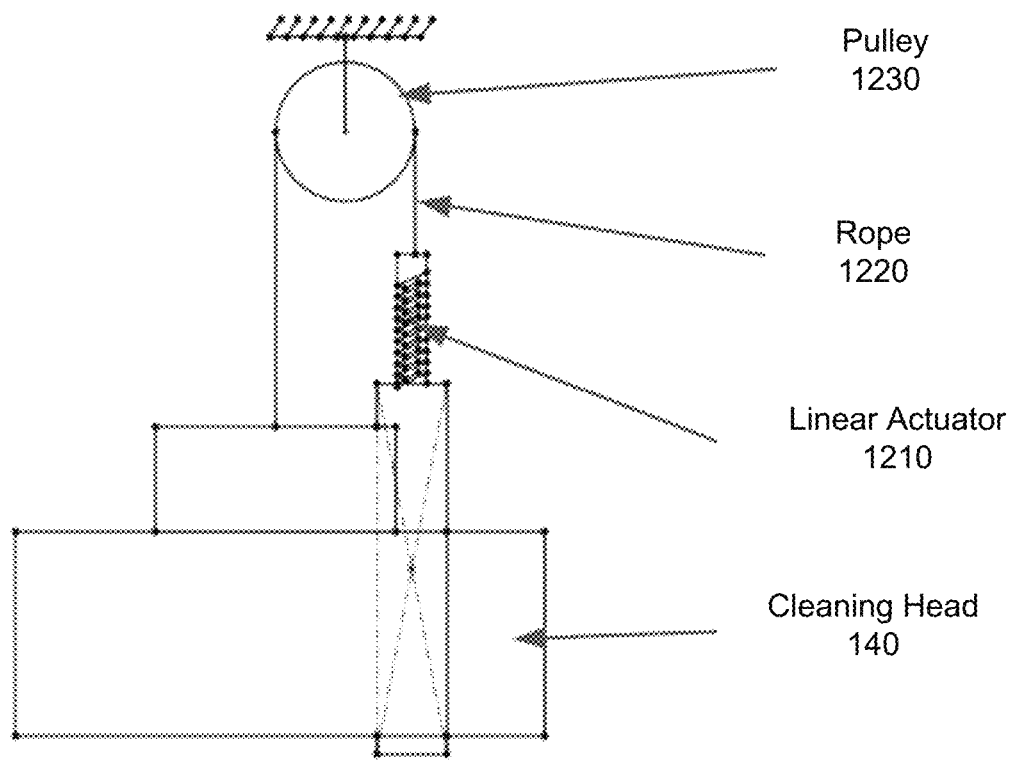
FIG. 12 illustrates a linear actuator-based system of the autonomous vacuum, according to one example embodiment.

FIG. 12 illustrates a linear actuator-based system of the autonomous vacuum, according to one example embodiment. Self-locking may also be used by using a linear actuator 1210 with a lead screw, rack and pinion, or a linear motor type arrangement, where the cleaning head 140 is coupled to a rod end via a rope or a similar elastic element. Using a lead screw provides a self-locking advantage. Locking in the rack and pinion and linear motor based system may be achieved using a worm reducer motor or with a solenoid based or similar latching/braking mechanism. The pulley 1230 may be replaced with a static guide like FIG. 9 or a bowden cable arrangement. The rope 1220 may be integrated to the cleaning head 140 by forming a loop around a pin on the cleaning head 140, having a bolted joint, soldering and similar joining strategies, crimped ends, over molding an elastomer, press fitting the rope end on the cleaning head 140, etc.

Figure 13:
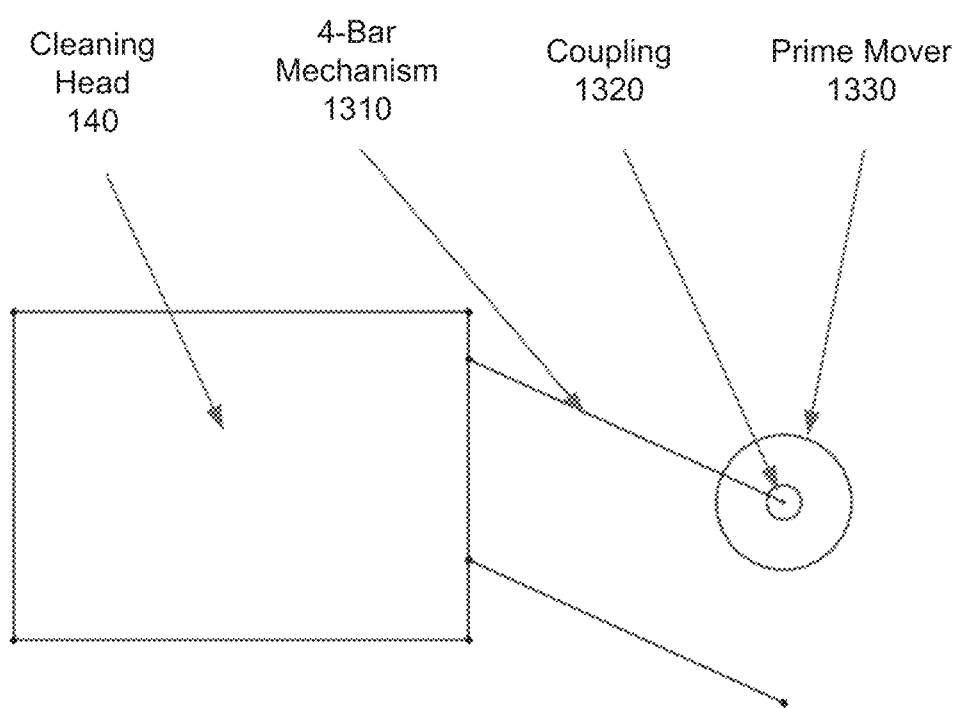
FIG. 13 illustrates a side view of a direct drive of the autonomous vacuum, according to one example embodiment.

FIG. 13 illustrates a side view of a direct drive of the autonomous vacuum, according to one example embodiment. For instance, actuation of the cleaning head 140 may be achieved by directly actuating a 4-bar mechanism 1310 with the prime mover 1330. Compliance that may be required for surface irregularities may be accommodated either in the coupling 1320 between the 4-bar mechanism 1310 and the prime mover 1330 or mounting of the cleaning head 140 on the chassis or the 4-bar mechanism 1310 and the cleaning head 140. Rotation about the coupling 1320 by the prime mover 1330 causes vertical movement of the cleaning head 140.

Figure 14:
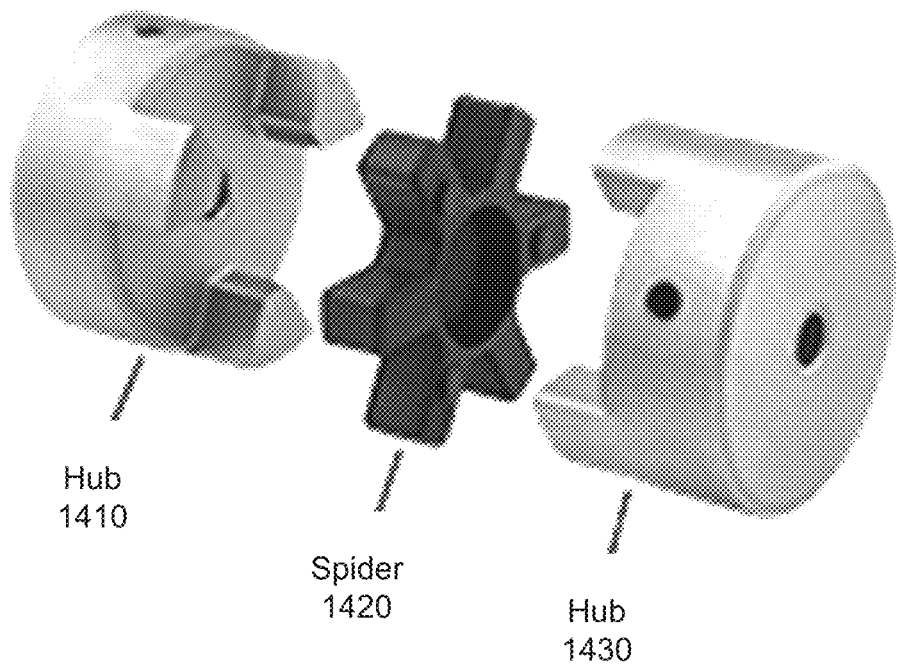
FIG. 14 illustrates a compliant jaw coupling of the autonomous vacuum, according to one example embodiment.
Figure 15:
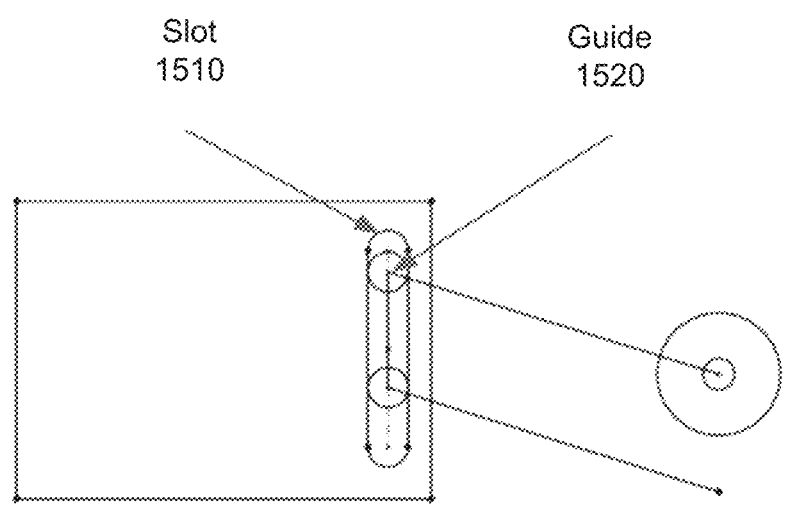
FIG. 15 illustrates a side view of a slotted compliance of the autonomous vacuum, according to one example embodiment.

FIG. 14 illustrates a compliant jaw coupling of the autonomous vacuum, according to one example embodiment. The coupling between the prime mover and the 4-bar pivot or linkage may be a compliant jaw type collar on a motor output shaft and the 4-bar pivot with recesses between them that provides compliance or an elastic element to provide damping. The example shown includes a hub 1410 and a hub 1430, wherein the hubs 1410 and 1420 comprise recesses that key to jaws of the spider 1420. The jaw spacing may be adjusted based on the compliance needed. Similar other engagement mechanisms with a variety of elastic elements may also be used. Additionally or alternatively, compliance may be accommodated near chassis mounting of the 4-bar linkage or near the cleaning head 140 mounting, shown in FIG. 15. The slot 1510 recess can have an elastic element to provide the damping against the vibrations. Similar slot 1510 and guide 1520 arrangement can be on the chassis side. In this arrangement, the coupling between the prime mover and linkage can be rigid for all intents and purposes. The prime mover for this mechanism may be either the worm reducer motor or a geared motor with the latch-catch/braking arrangement for self-locking. An advantage of this arrangement is that compliance in the terms of the elevation of the cleaning head 140 remains constant across all of the actuation elevations.

Figure 16:
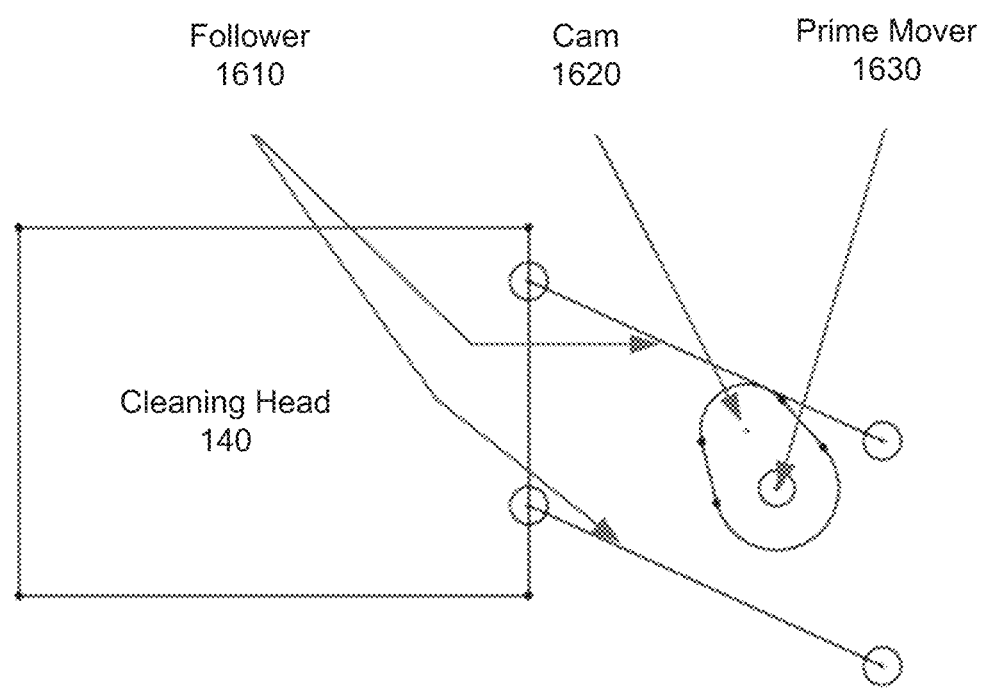
FIG. 16 illustrates a side view of a cam-follower mechanism of the autonomous vacuum, according to one example embodiment.

FIG. 16 illustrates a side view of a cam-follower mechanism of the autonomous vacuum, according to one example embodiment. In some embodiments, facilitating actuation of the cleaning head 140 may be done using a cam 1620 and follower 1610. The cam 1620 may be coupled to the prime mover 1630, and the 4-bar linkages may have followers 1610 on either one or multiple links to provide transmission. The cam 1620 may be directly connected to the prime mover 1630 as shown in the FIG. 16, or other motion transmission strategies may be used for packaging constraints or otherwise. Alternatively, a linear actuator may be used to actuate the cam 1620.

The follower 1610 remains in contact with the cam 1620 due to weight of the cleaning head 140, or an optional elastic element that may force the follower 1610 in contact. Compliance is achieved by virtue of the follower 1610 leaving contact due to surface irregularities and/or actuators. A profile of the cam 1620 may be adjusted for various motion profiles and kinematics. A rolling contact may be accommodated in the cam 1620 to reduce wear.

One advantage of this approach is that additional normal reaction may be provided to the cleaning head 140 by forcing cam contact on the lower link or providing a slot in one of the links and guiding the cam 1620 in the slot, thus improving the cleaning efficacy. An elastic coupling between the prime mover 1630 and the cam 1620 may dampen vibrations coming from the cleaning head 140 due to ground interactions.

Figure 17:
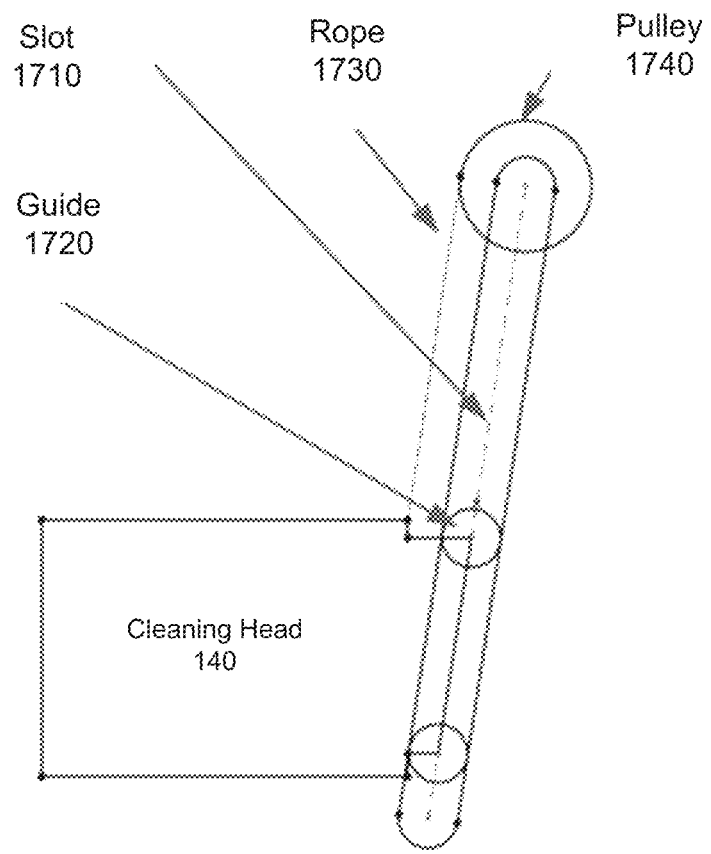
FIG. 17 illustrates a side view of a linear rail of the autonomous vacuum, according to one example embodiment.

FIG. 17 illustrates a side view of a linear rail of the autonomous vacuum, according to one example embodiment. Compliance in the cleaning head 140 may be achieved by linearly guiding the cleaning head 140 along the linear rail comprising the slot 1710 and the guide 1720. The rope 1730 may be fed to the mechanism or the rope 1730 may be replaced by a timing belt. Motion may be affected by linear actuators. The cleaning head 140 may be forced on the ground by adding an elastic tension element in the lower section of the slot 1710. Position sensing of the cleaning head 140 may be done using linear potentiometers along the slot 1710 as well as rotary position sensing in at the pulley 1740 or the prime mover. Some advantages of this approach are that the position sensing is direct, and the cleaning head 140 may not follow a curved trajectory when the cleaning head 140 moves up, unlike when using the 4-bar pivot (or linkage).

Figure 18A:
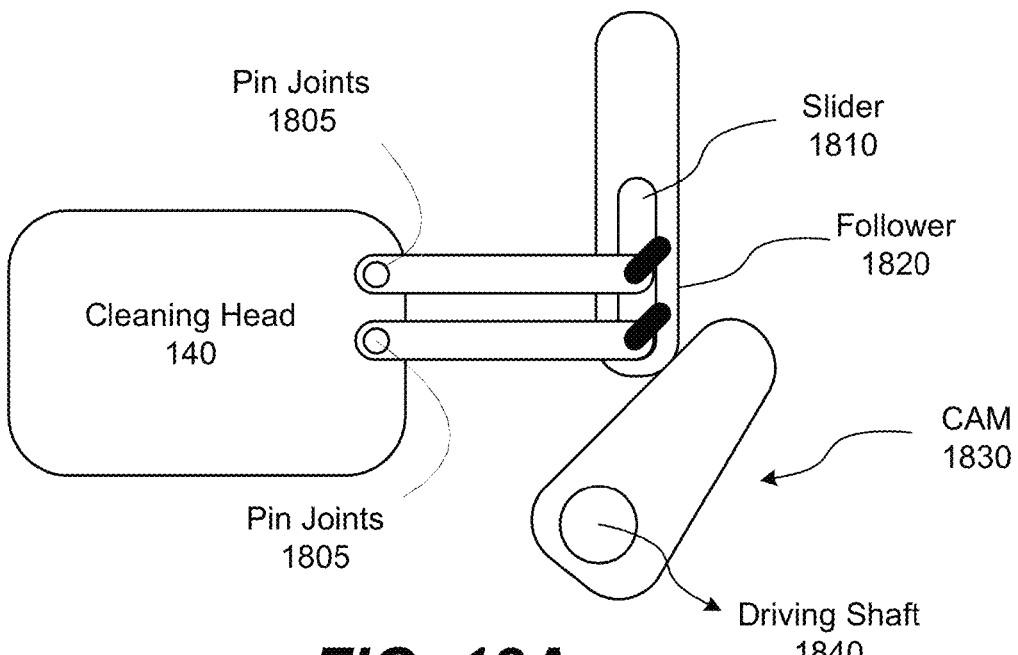
FIG. 18A illustrates a second alternative approach to compliance of the cleaning head, according to one example embodiment.
Figure 18B:
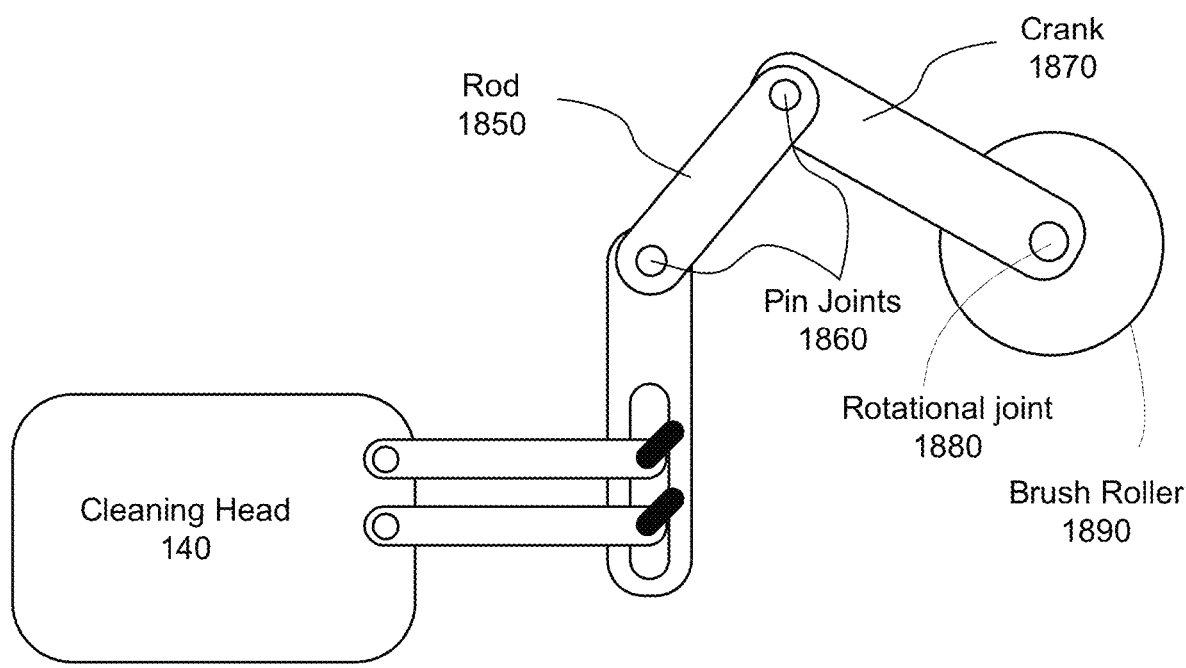
FIG. 18B illustrates a third alternative approach to compliance of the cleaning head, according to one example embodiment.

FIG. 18A illustrates a second alternative approach to compliance of the cleaning head, according to one example embodiment. In particular, FIG. 18A includes a follower 1820 that may slide along the slider 1810, pin joints 1805 that are rigid linkages, and a cam 1830 with a driving shaft 1840. FIG. 18B illustrates a third alternative approach to compliance of the cleaning head, according to one example embodiment. In particular, FIG. 18B includes a rod 1850 connected to a crank 1870 with a pin joint 1860. The crank 1870 connects to a brush roller 1890 via a rotational joint 1880.

Figure 19:
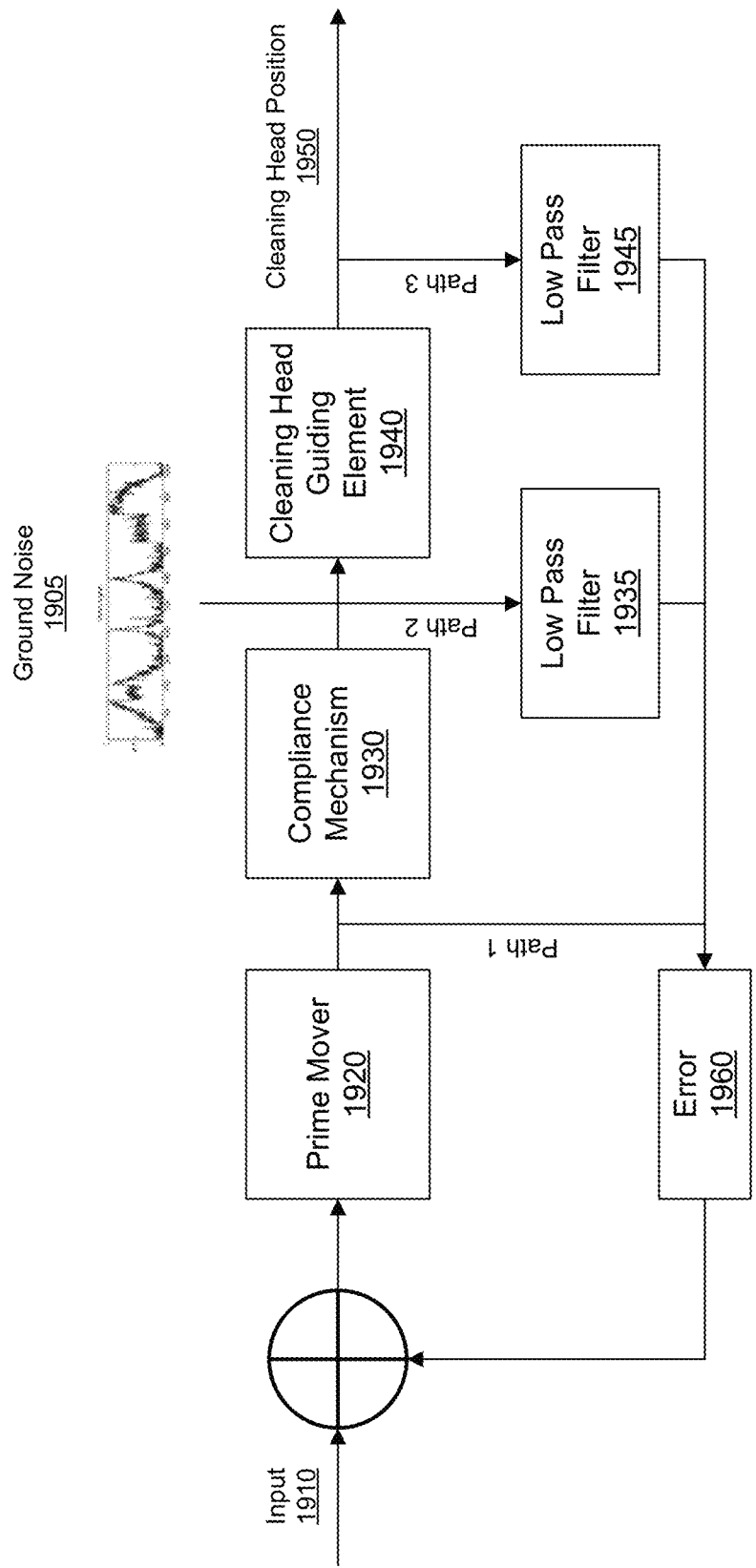
FIG. 19 illustrates a loop closure for actuation of the autonomous vacuum, according to one example embodiment.

FIG. 19 illustrates a loop closure for actuation of the autonomous vacuum, according to one example embodiment. The actuation of the cleaning head 140 may be modeled as a multiple input/single output (MISO) system with inputs 1910 from a surface type/obstacle/debris detection algorithm and ground noise 1905 coming from surface irregularities in a floor. Irregularities missed by a command generating algorithm may be treated as ground noise 1905.

Sensing the position of the cleaning head 140 is used for adjusting 1950 cleaning head 140 elevation. Closing the loop along path 1 of FIG. 19 may be done by sensing the position of the prime mover 1920. For a motor driven system, this may be done with shaft encoders either at the output shaft/locking mechanism or the motor shaft or reed/limit switches or a linear position sensor when linear actuation is used. Though along path 1, the ground noise 1905 does not reach the control loop, which bolsters stability of the autonomous vacuum 100, and cleaning head 140 position may be significantly different due to the non-linearities in compliance and guiding elements.

Closing the loop along path 2 may be done by putting an encoder/potentiometer at the compliance mechanism 1930, e.g., the 4-bar linkages/pivots or a slotted lever with a potentiometer. Linear guides may have a rotary encoder or potentiometer at the pulley arrangement or a linear potentiometer. Closing the loop directly at the cleaning head 140, along path 3, may be done by including a position/proximity sensor directly into the cleaning head 1940 body. Although paths 2 and 3 are more direct and accurate loop closure alternatives, ground noise enters the control loop. All the cleaning head 140 perturbations, albeit minute, may be seen as deviations from a steady commanded state by a controller. The controller may generate an unsteady command to the prime mover to correct this error, and the cleaning head 140 may need to differentiate between the actual obstacle in the trajectory from the minute ground deviations. A low pass signal filtering 1935 and 1945 is thus integrated on feedback paths 2 and 3, respectively. Furthermore, the cleaning head 140 may be actuated to reduce jitters in the autonomous vacuum 100, thus safeguarding the components in the cleaning head 140.

Generating the command signal in FIG. 19 may be done with an obstacle/surface type detecting mechanism, directly by a user, using task requirements like sweeping, mopping, patrolling, or by the mobility system to relieve some of its load due to the cleaning head 140 friction or when it detects too little load due to high centering at an obstacle. Calibration of the cleaning head 140 elevation may be done by introducing a current sensing at a hardstop, limit/reed switch, proximity sensor, or computer vision.

Side Brush Roller

Figure 20A:
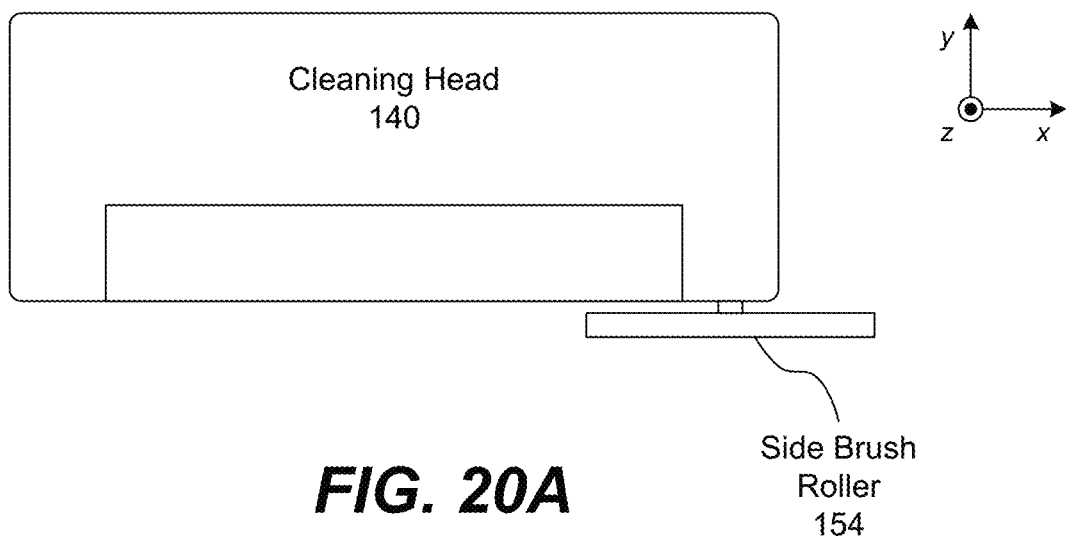
FIG. 20A illustrates a front view of the side brush roller of the autonomous vacuum, according to one example embodiment.
Figure 20B:
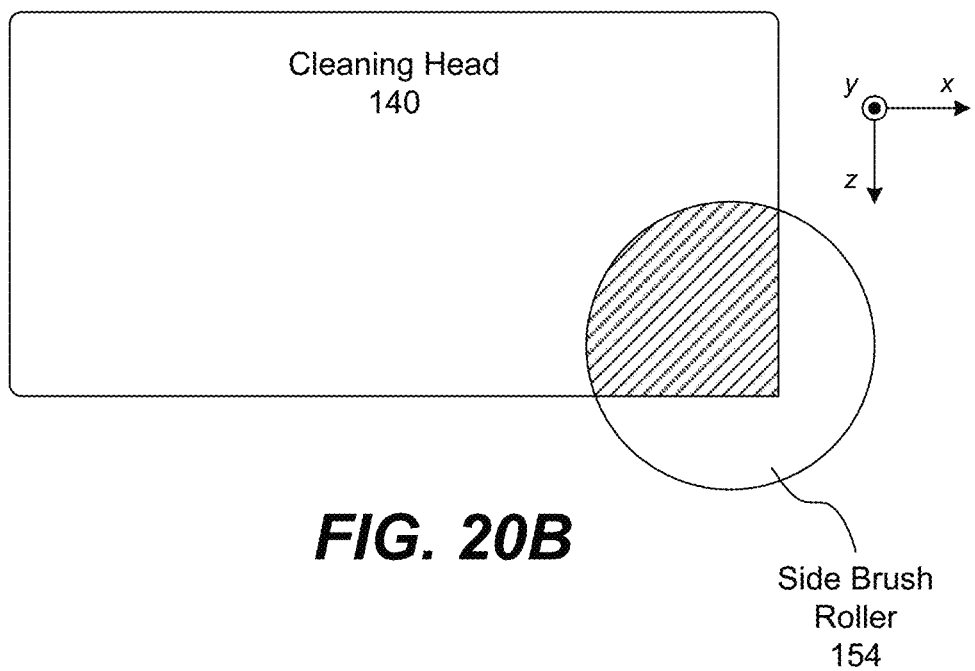
FIG. 20B illustrates a top view of the side brush roller of the autonomous vacuum, according to one example embodiment.

In some embodiments, the side brush roller 154 of the autonomous vacuum 100 may be hidden under the body of the autonomous vacuum 100 and may be indexed into the hidden position. FIG. 20A illustrates a front view 2000 of the side brush roller 154 of an autonomous vacuum and FIG. 20B illustrates a top view 2050 of the side brush roller 154 of the autonomous vacuum, according to one example embodiment. The side brush roller 154 is a horizontally rotating (vertical axis of rotation) cleaning device that is attached to the autonomous vacuum 100. The side brush roller 154 is used to clean debris from edges found between walls or objects and the floor. The side brush roller 154 is also used in some instances to widen a cleaning path width of a single pass of the autonomous vacuum 100.

Existing side brush rollers 154 are connected to a motor driven shaft with a screw to allow for user replacement. Existing implementations of side brush rollers 154 have the following issues: bristles or flaps from the side brush roller 154 are left sticking out of the autonomous vacuum 100, resulting in a visually unappealing industrial design; bristles directed forwards may become entangled in or deformed by obstacles and rough floors; replacement of the side brush roller 154 is tedious and time-consuming for the user.

A side brush roller 154 design to solve the aforementioned problems may comprise: a controlled driving mechanism to rotate the side brush roller 154; a hidden configuration which configures the side brush roller 154 to achieve an appealing industrial design; an ability to position the side brush roller 154 into the hidden configuration; and a side brush roller 154 mounting type that allows for user maintenance/replacement at end of life.

Figure 21:
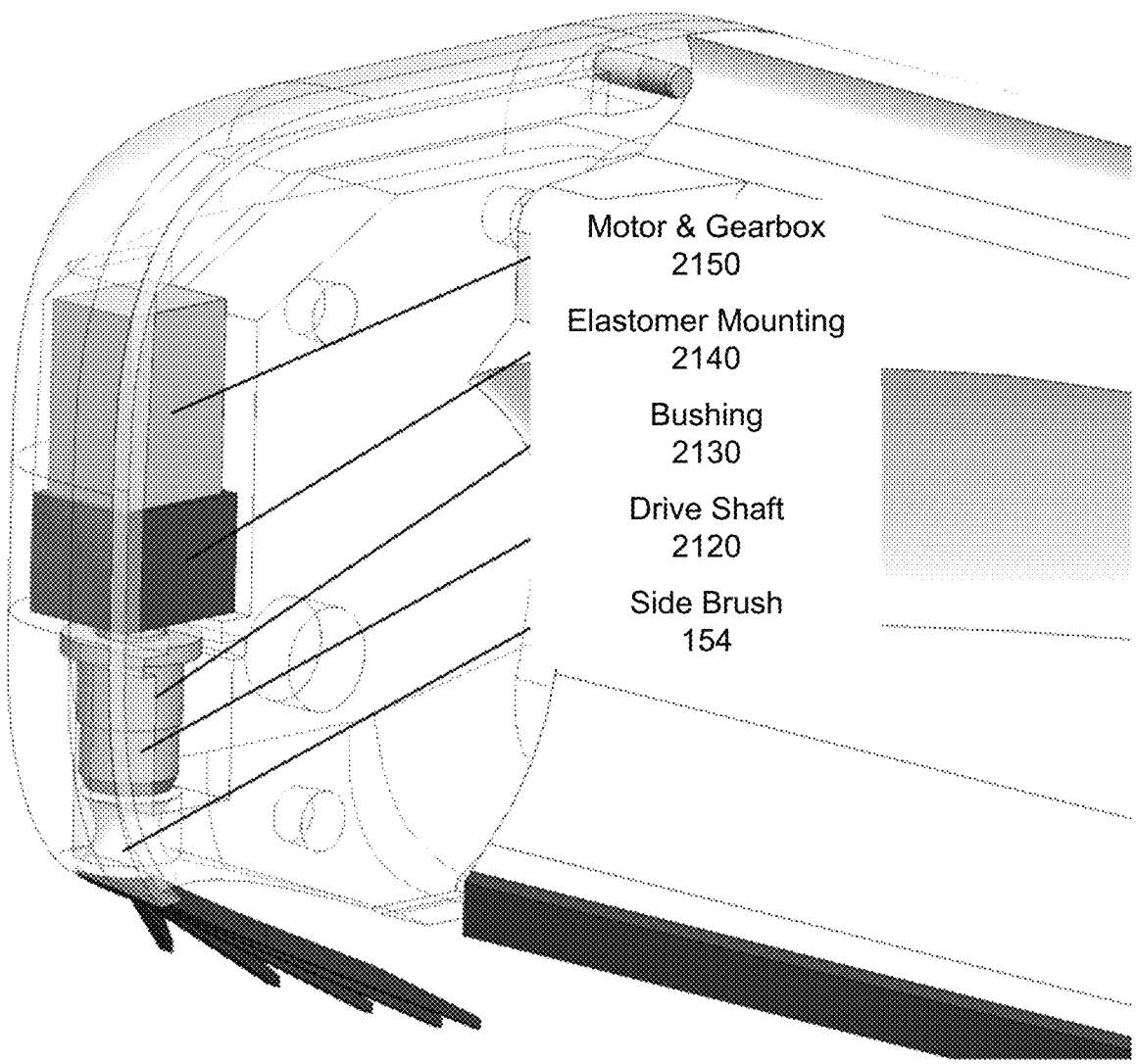
FIG. 21 illustrates a driving mechanism for the side brush roller of the autonomous vacuum, according to one example embodiment.

FIG. 21 illustrates a driving mechanism for the side brush roller 154 of the autonomous vacuum, according to one example embodiment. A combined motor and spur gearbox 2150 are used as the driving mechanism to drive the side brush roller 154, supported by a plastic bushing 2130 that supports the drive shaft 2120 under load, as shown in FIG. 21. The motor transmits torque through the gearbox and shaft coupling into the side brush roller 154 to rotate the side brush roller 154 in either direction. With individual motor control, the side brush roller 154 may be driven independently from the brush roller 135, allowing for separate RPM and direction control. The elastomer mounting 2140 mounts the bushing 2130 to the motor and gearbox 2150.

Figure 22:
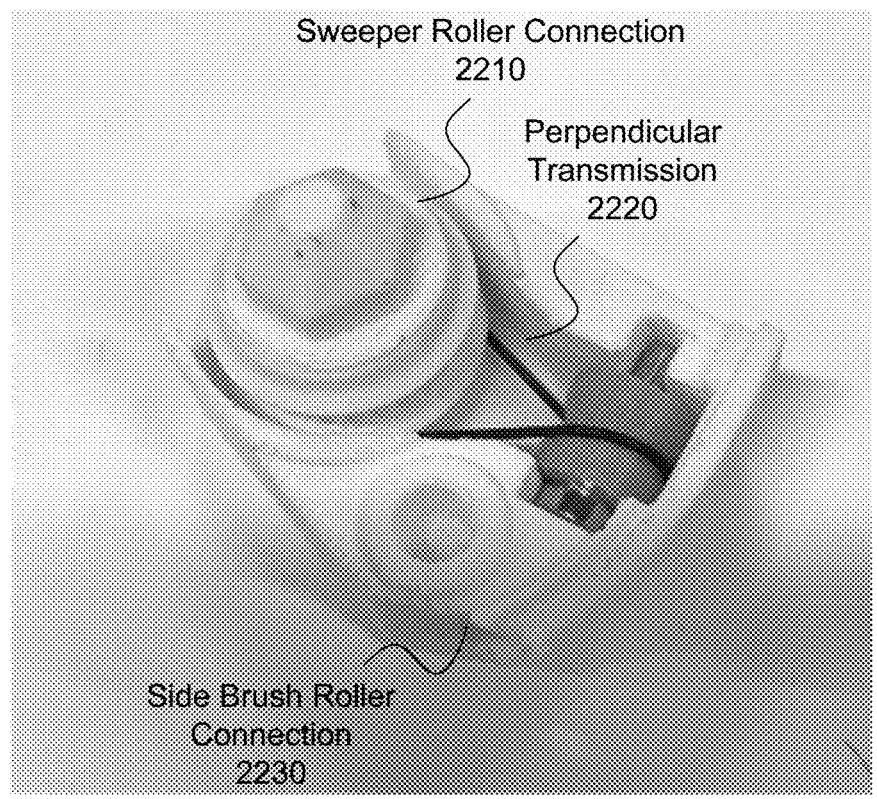
FIG. 22 illustrates a limited coupler for the side brush roller of the autonomous vacuum, according to one example embodiment.

FIG. 22 illustrates a limited coupler for the side brush roller 154 of the autonomous vacuum, according to one example embodiment. For instance, the axis of the side brush roller 154 may be driven by rotation of the brush roller 135, and the side brush roller 154 spins at a set ratio synchronization with the brush roller 135. A perpendicular transmitting gearing system 2220 (bevel gear, worm gear) or a timing belt may be used to rigidly link the two axes. A smooth belt, torque limited coupler or flexible gearing profile may be used to transmit the rotation from the brush roller 135 to the side brush roller 154 to set a maximum transmitted torque. This allows the torque transmission mechanism and the motor torque specification to be lower and sets a configurable torque limit to prevent the side brush roller 154 from rotating when it is stuck, jammed, or entangled. One end of the perpendicular transmission 2220 is the sweeper roller connection 2210 connecting to the sweeper roller. The other end of the perpendicular transmission 2220 is the side brush roller connection 2230 connecting to the sweeper roller. The flexible coupling between the brush roller 135 and side brush roller 154 may be designed externally from the side cap by having the torque transmitted between the flap extensions.

Figure 23A:
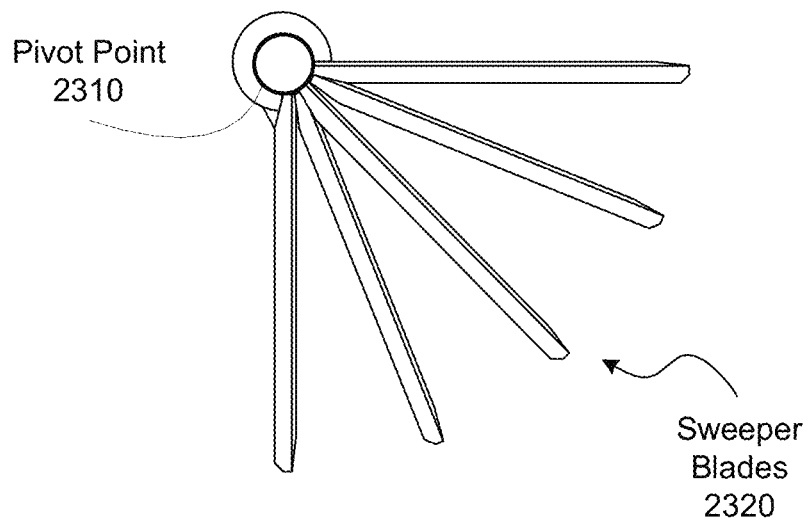
FIG. 23A illustrates a radially asymmetric design of the side brush roller of the autonomous vacuum, according to one example embodiment.

The side brush roller 154 may be designed in a hidden configuration. In a hidden position, the sweeper blades 2320 (which may be comprised of bristles) of the side brush roller 154 are facing backwards, preventing the sweeper blades 2320 from getting deformed by obstacles. The side brush roller 154 may be made such that it only occupies the degrees of range that may be covered by the main body of the autonomous vacuum 100. This radially asymmetric design 2300 has sweeper blades 2320 in a confined section of the side brush roller 154 which periodically clears the wall and crevices during a cleaning cycle. FIG. 23A illustrates an example of a radially asymmetric design 2300 of the side brush roller 154, including the sweeper blades 2320 fixed about the pivot point 2310.

Figure 23B:
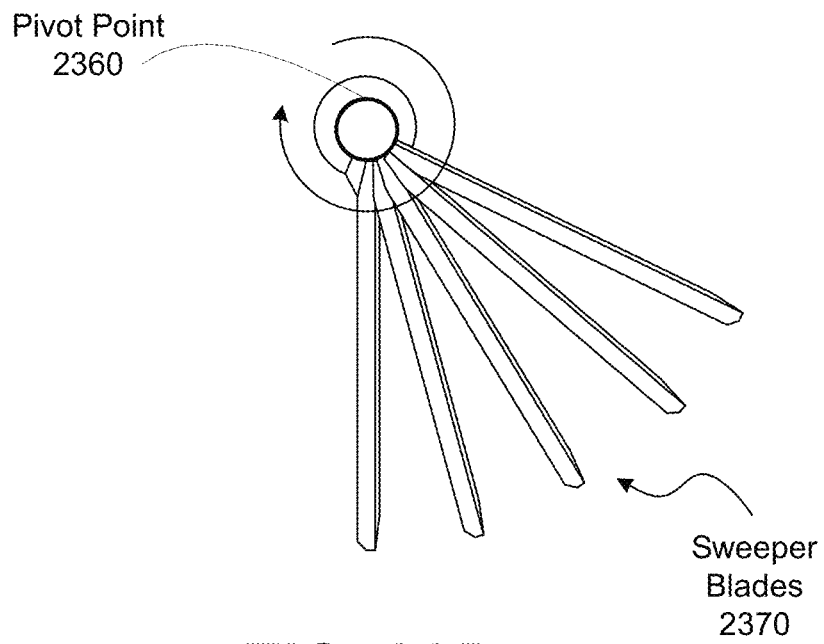
FIG. 23B illustrates a folding design of the side brush roller of the autonomous vacuum, according to one example embodiment.

The side brush roller 154 may also be made with radially symmetric sweeper blades 2320 that are able to collapse into a hidden form to fit in a concealed section of the autonomous vacuum 100. FIG. 23B illustrates an example of the folding design 2350 of the side brush roller 154. The side brush roller 154 may un-collapse by rotating forward, causing the folding sweeper blades 2320 to hit a forward hard-stop position and retain rotational symmetry. Rotating backwards forces the pivoting sweeper blades 2320 to locate against the other end of their travel and fold into a smaller space. An additional actuator or centripetally activating mechanism may also be used to unfold and collapse the side brush roller 154 into its hidden configuration.

Figure 24:
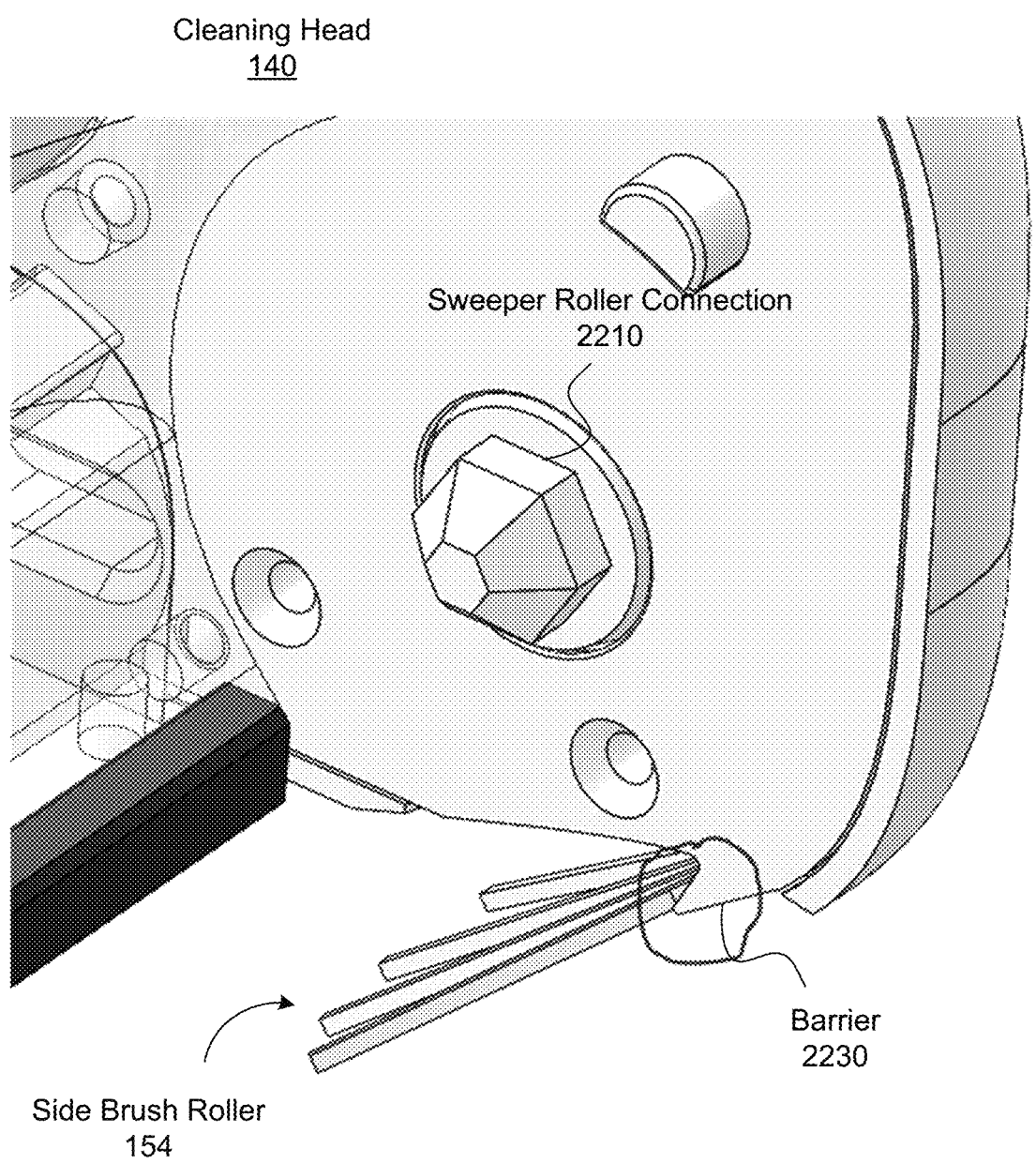
FIG. 24 illustrates a hidden configuration of the side brush roller of the autonomous vacuum, according to one example embodiment.

FIG. 24 illustrates a hidden configuration of the side brush roller 154 of the autonomous vacuum, according to one example embodiment. The side brush roller 154 may be positioned into the hidden configuration by driving the side brush roller 154 against a barrier 2230 intentionally designed on the cleaning head 140 in the path of the side brush roller 154. The side brush roller 154 may pass over the barrier 2230 in the forward direction via a ramped lead. When run backward, the side brush roller 154 may be caught on the barrier, preventing the bristles from continuing to rotate in the backward direction. The motor is run at a low voltage such that it stalls on the barrier. This control mechanism may also be achieved with a dedicated ratcheting mechanism on the motor output.

In some embodiments, the barrier 2230 may be actuated into position using another motor or solenoid to stop the side brush roller 154 in the hidden configuration. The side brush roller 154 in this instance may rotate freely in either direction. In other embodiments, sensing the position of the side brush roller 154 to detect when the brush is in the hidden location may be achieved using an encoder, limit switch, or hall effect sensor with a control loop from the motor controller.

The side brush roller 154 may be connected to a driving shaft by a set of through-thickness magnets and coupling teeth to transmit torque. This creates a robust connection point that supports tool-less removal by a user. The magnets securely hold the side brush roller 154 onto the shaft to allow torque transmission through the teeth.

Dual-Mode Cleaning

The autonomous vacuum 100 may perform both wet and dry cleaning. The autonomous vacuum 100 may use an angularly-offset system designed such that each system can be individually activated with the ground for cleaning. For the autonomous vacuum 100 to provide a high level of cleaning efficacy on floors while requiring very low user intervention, the following four waste types have to be addressed: small, dry debris spread over a variety of surfaces types; large, dry debris spread over a variety of surfaces types; small dust particles that stick to the floor using static; and stains over a variety of surface types.

The autonomous vacuum 100 may address these four waste types using a universal cleaning head 140 that has one rotating brush roller 135 driven at different RPMs according to a cleaning situation. This brush roller 135 may work without the use of solvents (e.g. with cleaning bristles, fins, flaps, microfiber etc.). However, the brush roller 135 may provide very limited efficacy in certain cleaning scenarios. Thus, the autonomous vacuum 100 may selectively dispense solvent into the cleaning head 140 cavity to address this. However, unless the autonomous vacuum 100 may control the flow of this solvent, the solvent disperses all over on the floor and makes a mess rather than cleaning it. Best case scenario, the solvent dissolves the stain and spreads it around on the floor rather than cleaning it.

However, the constraints that drive the design of a cleaning system for efficacy for the first two waste types differ from those that drive the design for efficacy on the second two waste types. For instance, to clean the first two waste types, the autonomous vacuum 100 may need high clearance of the cleaning head 140. Things like almonds, popcorn, bottle caps, etc. require ducting that is big enough to allow smooth passage of waste all the way to the waste containment location on the autonomous vacuum 100. However, the autonomous vacuum 100 that cleans the first two waste types performs worse in the presence of liquid because things like popcorn, cereals, etc. become mushy and do not move easily. Similarly, things like dirt tend to cake on the internals of ducts and not move into the waste bag 112.

An autonomous vacuum 100 that cleans the second two waste types using solvent does not require high clearance because the debris is dissolved in the solvent, so space can be minimized using smaller ducting. Further, the autonomous vacuum 100 may need to have low clearance in the ducts to suck up water in a close duct flow pattern rather than an open duct flow pattern. This is because in an open duct flow pattern, the autonomous vacuum 100 ends up pulling in only air. Given these constraints, two cleaning rollers may be used: one with high clearance and a dry cleaning cavity for cleaning the first two waste types (e.g., a brush roller 135) and one with low clearance and a wet cleaning cavity for cleaning the second two waste types (e.g., a mop roller).

Figures 25A, 25B:
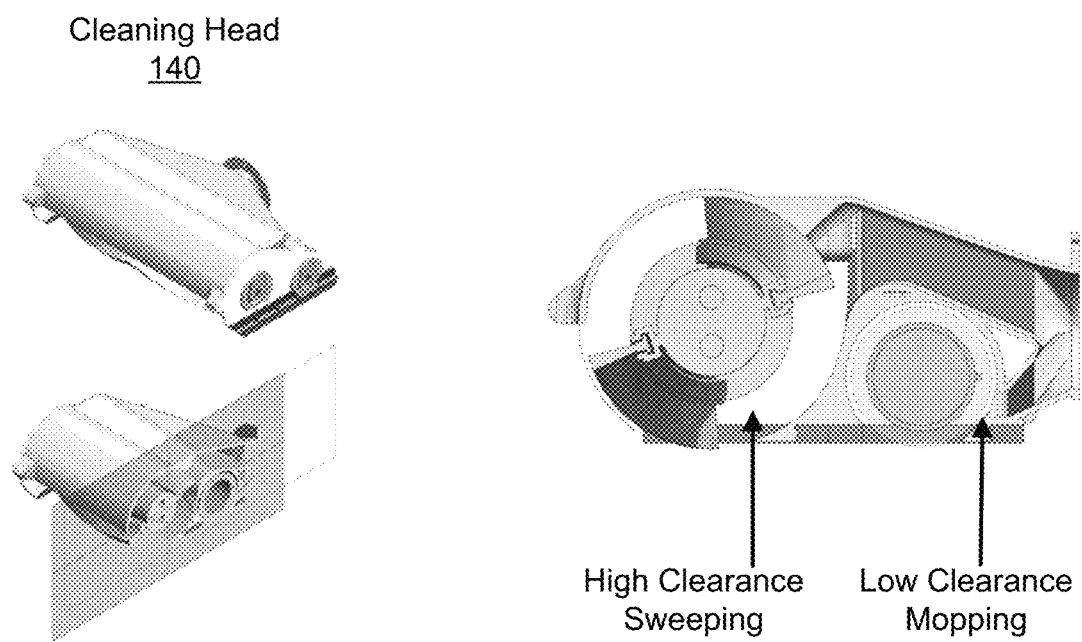
FIG. 25A illustrates perspective views of the cleaning head of the autonomous vacuum, according to one example embodiment.
FIG. 25B illustrates a side view of the cleaning head of the autonomous vacuum, according to one example embodiment.

FIG. 25A illustrates perspective views of the cleaning head of the autonomous vacuum and FIG. 25B illustrates a side view of the cleaning head 140 of the autonomous vacuum, according to one example embodiment. An autonomous vacuum 100 with a brush roller 135 and a mop roller (e.g., "systems") may be able to activate each with the ground, which create the effects of:

Providing a normal force with the ground and a frictional force resisting motion of the autonomous vacuum 100, making it more difficult for the autonomous vacuum 100 to maneuver around Leaving a clean system in contact with the ground leaves it perceptible to having excess debris deposited on the system when not in use. This is particularly a problem in the mop roller, which can be soiled when interacting with the ground when not being operated Leaving a dirty system in contact with the ground may result in it depositing debris on the ground. This is especially important for a dirty mop system passing on white floors and carpets.

If both systems are intended to engage with the ground in a mechanically coupled manner, then the systems require higher tolerances to ensure both systems are correctly engaged. In mechanically coupled systems, the brush roller 135 and the mop roller may also share weight to generate normal force. This means that the total down force of the systems is divided between both contact points.

These two systems each rely on sufficient normal force with the ground to function effectively. For the brush roller 135, the ground force is used to provide a good trailing seal to prevent waste from passing under it and to provide enough brush roller force to agitate debris into the airflow path. The mop roller requires ground force to sufficiently scrub out stains and maintain a consistent contact patch. Therefore, it is advantageous to have each system independently activated to minimize the total down force needed on the cleaning head 140 and the drag it creates.

Existing dual-mode autonomous vacuums 100 use one of the following solutions: leaving both systems fully engaged with the ground, relying on users to remove the mopping roller (or pad) to perform carpet cleaning; having an actuated mop pad to lift the mop over low pile carpets; having a combined wet-dry system that emits more noise and requires more user maintenance.

In order to solve these issues, the cleaning head 140 described herein is designed such that each system (brush roller 135 and mop roller) may be activated independently with the ground and may be lifted from the ground. This reduces negative impacts of having a system interact with the ground since the autonomous vacuum 100 may intelligently decide when each system to activate.

The systems are placed in the cleaning head 140 on separate angles of activation. When the cleaning head 140 is flat, the brush roller 135 is engaged, and when the cleaning head 140 is tilted backwards the mop roller is engaged. A system that is not engaged does not interact with the ground, which prevents dirt transfer to and from the ground and reduces the friction experienced with the ground (to improve mobility performance).

The systems are strategically located and directionally driven to better engage each system. The position of the pivot point and interaction of the systems with the ground means that the frictional force generated with the ground may assist in properly activating each system.

Figure 26A:
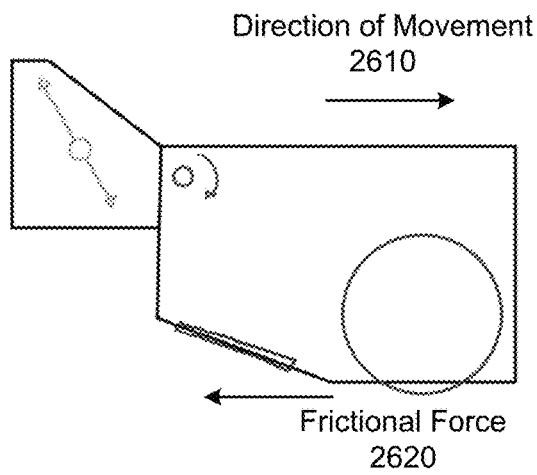
FIG. 26A illustrates frictional force as the autonomous vacuum moves forward, according to one example embodiment.

When in sweeping mode, the autonomous vacuum 100 will navigate forwards (cleaning head 140 direction forwards), and the frictional force of the brush roller 135 pivots the cleaning head 140 further into sweeping mode until it hits a pivot hard stop. FIG. 26A illustrates frictional force 2620 directed backwards as the autonomous vacuum moves forward 2610, according to one example embodiment.

Figure 26B:
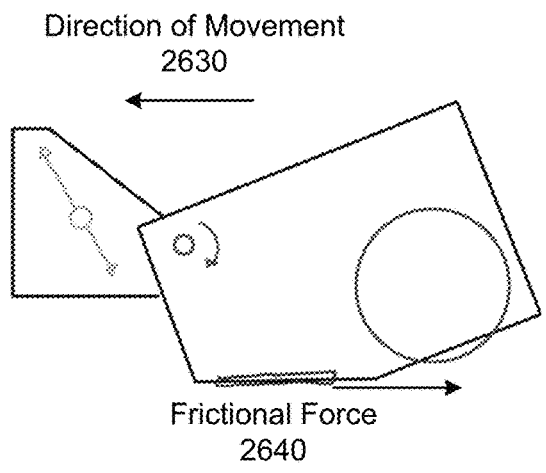
FIG. 26B illustrates frictional force as the autonomous vacuum moves backward, according to one example embodiment.

When in mopping mode, the autonomous vacuum 100 navigates backwards, allowing the frictional force to assist the pivot torque required to fully engage the mop roller on the ground. FIG. 26B illustrates frictional force 2640 as the autonomous vacuum moves backward 2630, according to one example embodiment.

The cleaning head 140 is mounted on a parallel path movement (linear rail or parallel link 4-bar) to achieve vertical movement and a rotational pivot to tilt the cleaning head 140 into the mopping and sweeping modes. The cleaning head 140 may be lifted to clear thresholds and disengage the systems from the ground. This prevents dirt contamination from the cleaning system to the ground (and vice versa) and improves the traction performance of the autonomous vacuum 100.

Parallel path movement is actuated by moving the lower limit of travel (rather than controlling position along the path). This prevents the autonomous vacuum 100 from high centering because the cleaning head 140 may only apply a downforce equivalent to its weight. The cleaning head 140 is free to move upwards along its travel when encountering uneven ground or obstacles.

The cleaning head 140 pivot is actively controlled using a motor, solenoid or hydraulic actuator. The systems' weight causes the neutral state to be in sweeping mode, therefore the actuator forces the pivot angle into the mopping orientation. Since the pivot system control only requires two positions, the pivot system may be controlled by running the actuator into stall against the end stops of the travel. Control feedback may be achieved using encoder, limit switch, hall effect or other sensor feedback.

Figure 27A:
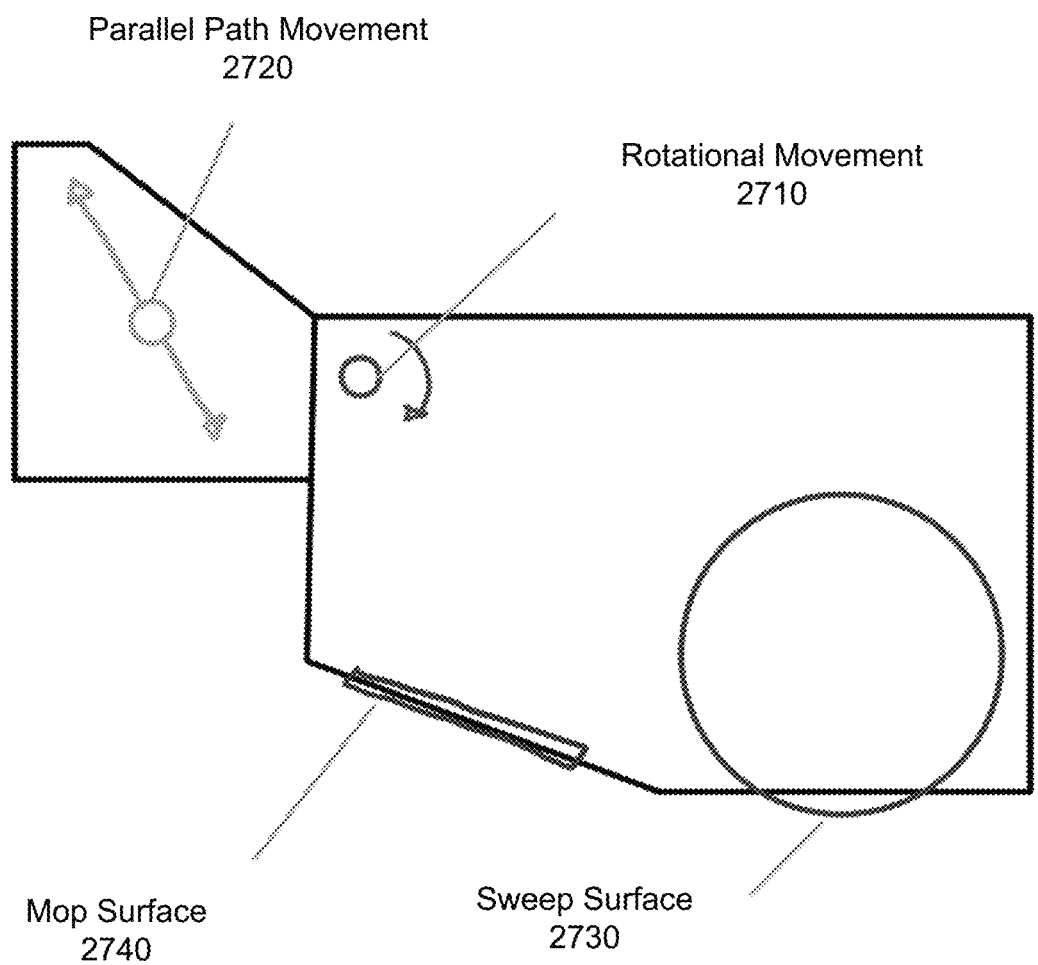
FIG. 27A illustrates the autonomous vacuum sweeping, according to one example embodiment.

FIG. 27A illustrates the autonomous vacuum sweeping, according to one example embodiment. The cleaning head 140 rotational movement 2710 is left as a free uncontrolled hinge. When the autonomous vacuum 100 is not cleaning, the cleaning head 140 is lifted by the parallel path movement 2720 to disengage both the systems. When the autonomous vacuum 100 is sweeping, the cleaning head 140 is lowered into the sweeping position. In this position, the brush roller 135 is in contact with the ground forming a sweep surface 2730 and the mop roller is lifted because it is angled up from the ground, shown as the mop surface 2740.

Figure 27B:
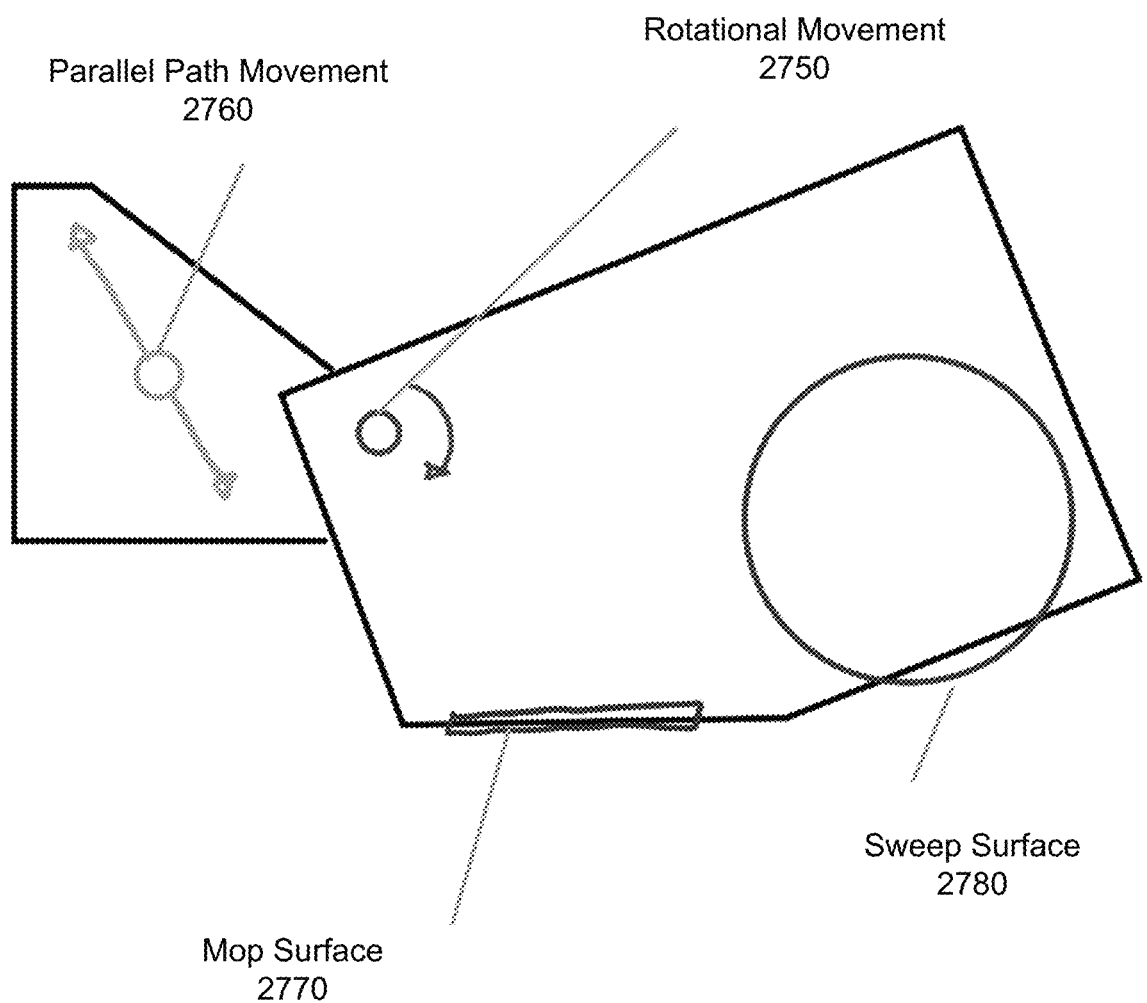
FIG. 27B illustrates the autonomous vacuum mopping, according to one example embodiment.

FIG. 27B illustrates the autonomous vacuum mopping, according to one example embodiment. When the autonomous vacuum 100 is mopping, it further lowers the parallel path movement 2760 to allow the cleaning head 140 to tilt backwards. Due to the angle between the systems, pushing down the location of the parallel path movement 2760 causes the cleaning head 140 to engage the mop roller and the brush roller 135 is lifted off the ground, hence the mop surface 2770 in contact with the ground with the sweep surface 2780 suspended.

The cleaning head 140 does not naturally rotate into a position for mopping because of the force balance of the systems. One of the following may be implemented to achieve mop roll engagement with the ground: having the existing (parallel path) actuator provide a downward force on the parallel path motion; pushing down on the parallel path motion with an additional actuator (separate from the existing actuator motor); adding down force to the parallel path motion and/or adjusting the moment force balance on the pivot point through springs, magnets, or additional weight; or adding high friction surfaces to the bottom of the cleaning head 140 (behind the brush roller 135) that assist in the ground frictional forces ability to switch into the mopping mode.

Figure 28:
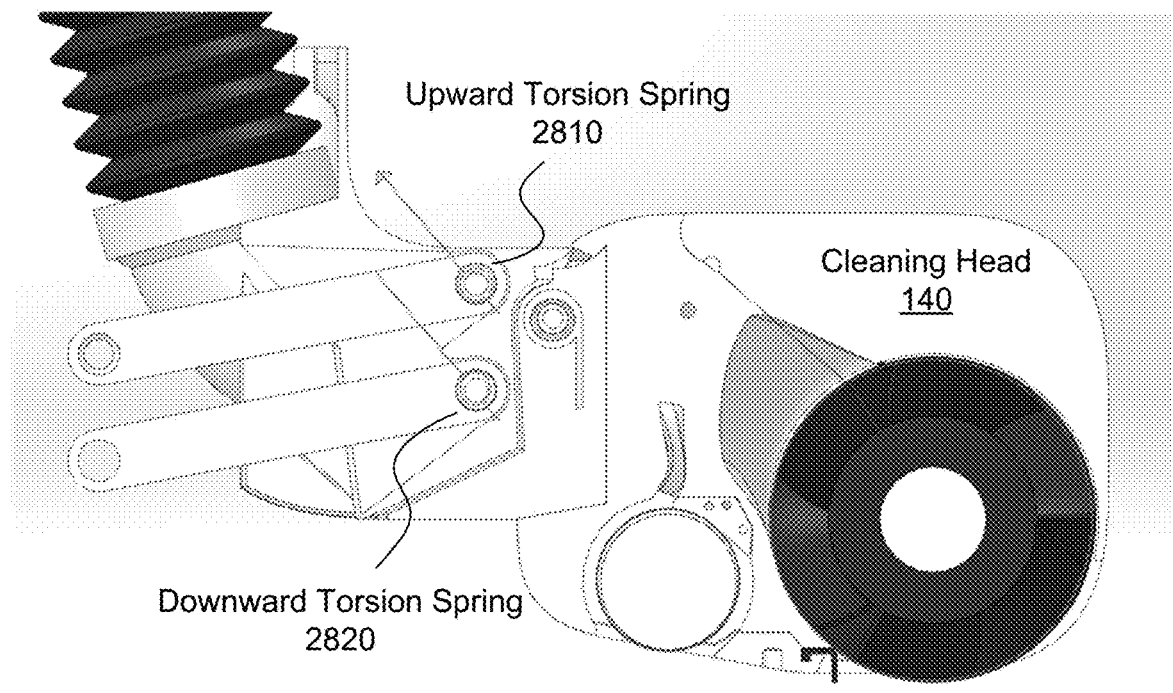
FIG. 28 illustrates torsional springs of the autonomous vacuum, according to one example embodiment.

The autonomous vacuum 100 may use torsional springs to provide additional down force on the parallel path travel and uses another set of torsional springs to apply a counter-clockwise moment force on the cleaning head 140 to reduce the down force required to switch into mopping. FIG. 28 illustrates torsional springs of the autonomous vacuum, according to one example embodiment, including an upward torsional spring 2810 and a downward torsional spring 2820. The downward torsional spring 2820 may provide the additional down force on the parallel path travel, whereas the upward torsional spring 2810 may provide the counter-clockwise moment force.

In some embodiments, the autonomous vacuum 100 may use a system that is weighted/sprung such that the mop roller is a natural state. When the cleaning head 140 is actuated down, the cleaning head 140 enters into mopping mode. The mop roller rotating in the reverse direction is used to activate a kickstand that forces the cleaning head 140 into the sweeping mode. This approach leverages a mop system motor to actively switch between mop roller and brush roller 135 engagement.

Figure 29A:
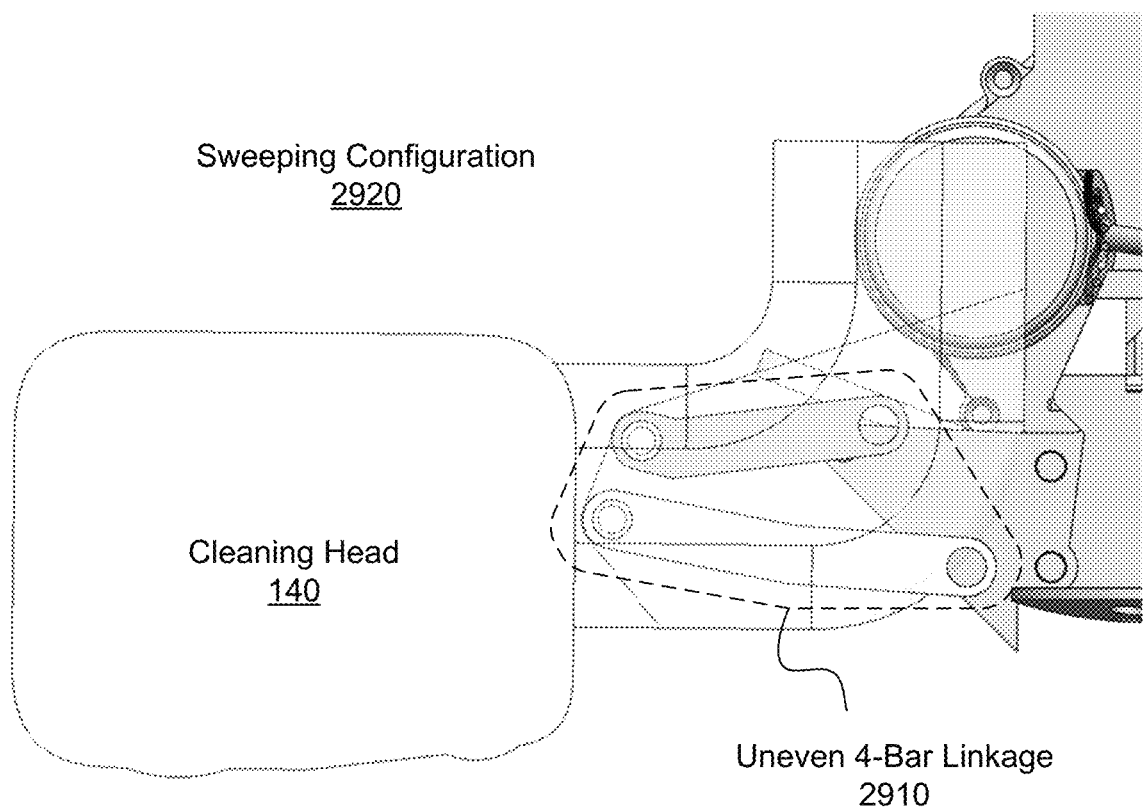
FIG. 29A illustrates a first view of a curved actuation path of the autonomous vacuum, according to one example embodiment.
Figure 29B:
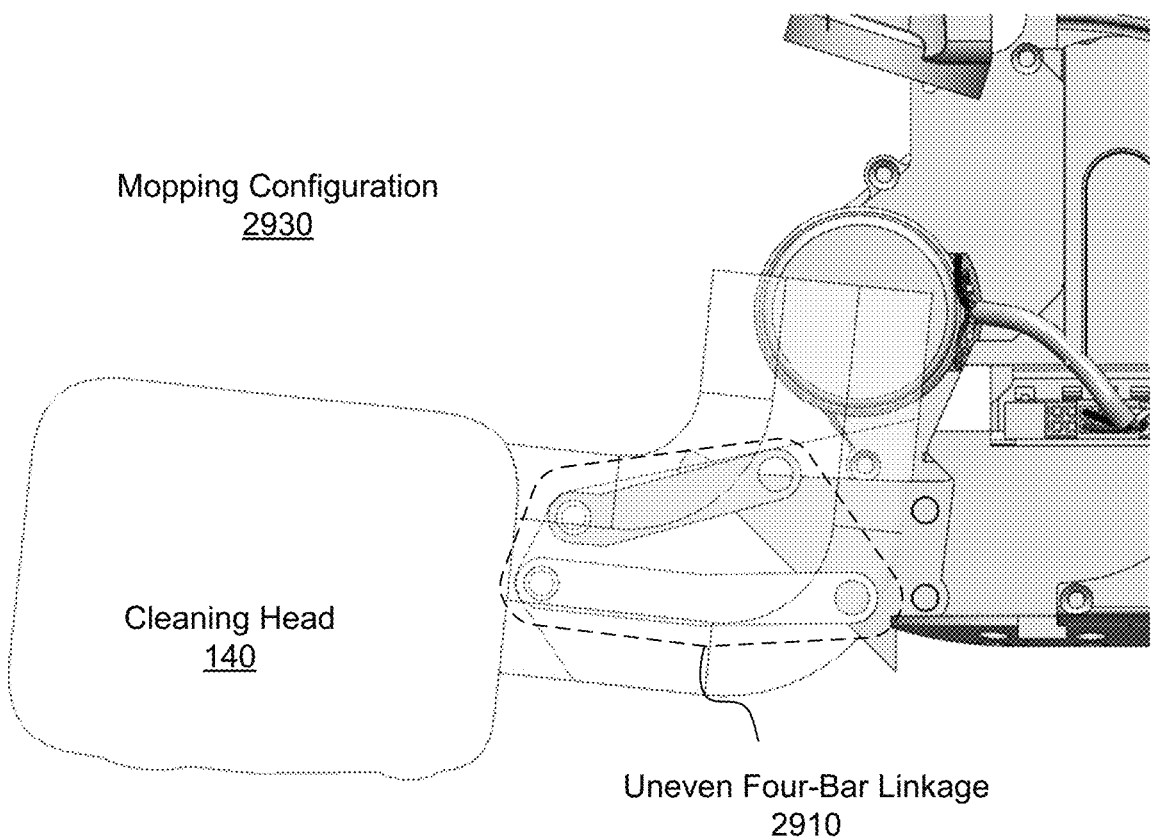
FIG. 29B illustrates a second view of a curved actuation path of the autonomous vacuum, according to one example embodiment.

In some embodiments, a cleaning head 140 system may include a curved actuation path, which both rotates and translates the cleaning head 140 through its travel. This may eliminate the need for a rotational pivot on the cleaning head 140 to switch between modes. The movement is achieved through an unequal length 4-bar linkage. The different positions of the 4-bar linkages correspond with the location and rotation of the cleaning head 140 for mopping, sweeping, and actuating up. The autonomous vacuum 100 may include torsion springs, ballast weight and/or magnets to have the mop roller engaged in the neutral state. Therefore, the sweeping and actuated-up positions may be achieved by moving up the bottom hard-stop of the 4-bar linkage. FIGS. 29A-B illustrate a couple views of a curved actuation path of the autonomous vacuum, having an uneven 4-bar linkage 2910, according to one example embodiment. FIG. 29A illustrates a sweeping configuration 2920 with the sweeper roller 144 in contact with the ground. FIG. 29B illustrates a mopping configuration 2930 with the mop roller 148 in contact with the ground.

SUMMARY

The autonomous vacuum of the above description is advantageous in displaying information about surface types in an environment. By showing the information to users via the background of an interface, a user may conceptualize the location of the autonomous vacuum in the environment while still being able to access a virtual rendering of where the autonomous vacuum is and interactive elements that control the autonomous vacuum. This may allow the user to determine whether a surface type shown in the interface matches the actions of the autonomous vacuum. For example, a user may see, via the background, that the autonomous vacuum is on top of hardwood. However, if the virtual rendering shows that the autonomous vacuum should be on a rug that lies on top of hardwood, the user may understand that the autonomous vacuum was moved under the rug and remedy the situation. The user may instruct the autonomous vacuum to alter its cleaning techniques to properly clean the hardwood in response. Thus, the information about the surface type in the environment may allow users to monitor the autonomous vacuum's cleaning of their environment.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
navigating, with a motor assembly of an autonomous vacuum, the autonomous vacuum to traverse an environment having a surface with a plurality of surface types, the plurality of surface types including a hard material surface type and a cloth material surface type;
receiving, from a camera assembly mounted on the autonomous vacuum, image data depicting a first set of visual characteristics of a first section of the surface that the autonomous vacuum is traversing;
determining, based on the visual characteristics corresponding to the first section, when the first section is the hard material surface type of the plurality of surface types;
responsive to determining that the first section is of the hard material surface type, obtaining a list of cleaning operations performable on the hard material surface type, wherein the list of cleaning operations performable on the hard material surface type includes a mopping operation that is not performable on the cloth material surface type;

generating a graphical user interface with a background displaying only the first section and a representation of the hard material surface type, wherein the graphical user interface displays a menu of interactive elements corresponding to the list of cleaning operations performable by the autonomous vacuum associated with the hard material surface type;

transmitting, to a client device associated with a user, the graphical user interface for display on the client device;

receiving, via the graphical user interface displayed on the client device, input selecting one interactive element from the menu associated with performing the mopping operation on the first section; and performing, with an actuator of the autonomous vacuum, the mopping operation on the first section that the autonomous vacuum is traversing.

2. The computer-implemented method of claim 1, further comprising:

receiving, from a camera assembly mounted on the autonomous vacuum, image data depicting a second set of visual characteristics of a second section of the surface;

determining that one or more characteristics in the second set of visual characteristics differ from the first set of visual characteristics;

responsive to determining that one or more characteristics differ, determining, based on the image data, that the second section is of the cloth material surface type of the plurality of surface types;

responsive to determining that the second section is of the cloth material surface type, obtaining a second list of cleaning operations performable on the cloth material surface type, wherein the second list of cleaning operations performable on the cloth material surface type; and performing, with the actuator of the autonomous vacuum, a cleaning operation from the second list of cleaning operations on the second section of the surface.

3. The computer-implemented method of claim 1, wherein determining, based on the visual characteristics, that the first section is one of the plurality of surface types comprises:

inputting the first set of visual characteristics to a machine learning model, wherein the machine learning model is configured to classify between the plurality of surface types.

4. The computer-implemented method of claim 1, further comprising:

receiving, from an inertial sensor mounted on the autonomous vacuum, inertial data indicating a speed of the autonomous vacuum as the autonomous vacuum is traversing the first section of the surface; and generating a user interface providing for display a visual representation of the autonomous vacuum and a scroll animation for a background representing the surface that the autonomous vacuum is traversing, wherein a speed of the scroll animation having a linear relationship to the speed of the autonomous vacuum.

5. The computer-implemented method of claim 4, further comprising:

generating the user interface to render one or more icons stationary as the background is rendered with the scroll animation.

6. The computer-implemented method of claim 4, further comprising:

determining, based on the first set of visual characteristics from the image data, an orientation pattern of the first section; and generating the user interface to render the background of the first section of the surface with a corresponding pattern of the hard material surface type with an orientation that matches the orientation pattern of the first section.

7. The computer-implemented method of claim 1, further comprising:

performing, with the actuator of the autonomous vacuum, another cleaning operation from the list of cleaning operations performable on the hard material surface type on the first section.

8. The computer-implemented method of claim 1, further comprising:

receiving, from an inertial sensor mounted on the autonomous vacuum, inertial data indicating a speed of the autonomous vacuum as the autonomous vacuum is traversing the first section of the surface, wherein determining that the first section of the surface is of the hard material surface type is further based on the speed of the autonomous vacuum when autonomously navigating the autonomous vacuum.

* * * * *